(12) United States Patent
Drewry et al.

(10) Patent No.: US 9,122,887 B2
(45) Date of Patent: *Sep. 1, 2015

(54) USER INTERFACE FOR SECURE VIRTUAL DOCUMENT MANAGEMENT SYSTEM

(71) Applicant: MOBILE IRON, INC., Mountain View, CA (US)

(72) Inventors: John Drewry, Los Altos, CA (US); Rahul Sharma, San Jose, CA (US); Gary Cribb, San Jose, CA (US); Pronob Ashwin, San Jose, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,451

(22) Filed: Nov. 11, 2013

(65) Prior Publication Data

US 2014/0230011 A1 Aug. 14, 2014

Related U.S. Application Data

(63) Continuation-in-part of application No. 13/734,525, filed on Jan. 4, 2013, now Pat. No. 8,863,297.

(60) Provisional application No. 61/584,112, filed on Jan. 6, 2012, provisional application No. 61/724,966, filed (Continued)

(51) Int. Cl.
*G06F 21/00* (2013.01)
*G06F 21/62* (2013.01)
(Continued)

(52) U.S. Cl.
CPC ...... *G06F 21/6218* (2013.01); *G06F 17/30233* (2013.01); *H04L 63/0435* (2013.01); *H04L 63/0815* (2013.01); *G06F 2221/2111* (2013.01)

(58) Field of Classification Search
CPC .................................................. H04L 63/0815
USPC .............................................................. 726/1
See application file for complete search history.

(56) References Cited

U.S. PATENT DOCUMENTS 7,533,157 B2 * 5/2009 Hu et al. ....................... 709/219
7,870,315 B2 1/2011 Moon (Continued)

OTHER PUBLICATIONS

Author Unknown, BackDoor.Generic10.ACXS Info, Fix BackDoor. Generic10.ACXS PC Errors, How to Guides to Fix Windows Errors Fix any PC Errors Fast and Easy—Complete How-to PC Fix Guides, p. 1-10, Aug. 2010, http://www. pcerrorsfix.org/howtofix/fix-BackDoor.Generic 1 O.ACXS-error .html.

*Primary Examiner* — Morshed Mehedi
(74) *Attorney, Agent, or Firm* — Van Pelt, Yi & James LLP

(57) ABSTRACT

A user interface for a virtual file management system that provides user access to managed content on mobile devices. The system comprises storage domains storing the managed content distributively using file systems, and a data infrastructure that organizes the managed content into a virtual file system. The data infrastructure includes a component that maintains policies defining controls for permissible operations on the managed content, the permissible operations including the file system primitives. A client application including a user interface is hosted on the mobile devices and is coupled to the data infrastructure and the storage domains and includes an enforcement component that retrieves and enforces the policies by applying the controls on the mobile devices.

6 Claims, 45 Drawing Sheets

Related U.S. Application Data on Nov. 10, 2012, provisional application No. 61/725,004, filed on Nov. 11, 2012, provisional application No. 61/725,007, filed on Nov. 11, 2012, provisional application No. 61/725,004, filed on Nov. 11, 2012.

(51) Int. Cl.
*H04L 29/06* (2006.01)
*G06F 17/30* (2006.01)

(56) References Cited

U.S. PATENT DOCUMENTS

| | | |
|---|---|---|
| 2005/0198061 A1 | 9/2005 | Robinson et al. |
| 2007/0050620 A1 | 3/2007 | Pham et al. |
| 2007/0078775 A1 | 4/2007 | Huapaya et al. |
| 2008/0059787 A1 | 3/2008 | Hohenberger et al. |
| 2009/0006334 A1 | 1/2009 | MacLaurin et al. |
| 2009/0007240 A1* | 1/2009 | Vantalon et al. .......... 726/4 |
| 2009/0125902 A1* | 5/2009 | Ghosh et al. .......... 718/1 |
| 2010/0228945 A1* | 9/2010 | Deshpande et al. .......... 711/207 |
| 2010/0257351 A1 | 10/2010 | O'Connor et al. |
| 2011/0047557 A1 | 2/2011 | Koskimies |
| 2011/0246427 A1* | 10/2011 | Modak et al. .......... 707/653 |
| 2011/0252071 A1* | 10/2011 | Cidon .......... 707/802 |
| 2012/0304233 A1* | 11/2012 | Roberts et al. .......... 725/82 |
| 2013/0227352 A1* | 8/2013 | Kumarasamy et al. ...... 714/47.1 |
| 2013/0318157 A1* | 11/2013 | Harrison .......... 709/203 |

\* cited by examiner

| iPad 📶 | | 9:06 AM | | | | 96% 🔋 |
|---|---|---|---|---|---|---|
| DROPBOX VAULT 🔳 | | ⬅ CLOUDARC MARKETING BUDGET.XLSX | | | ☰ ☆ | ↗ |

| 🔍 [MANAGE] ⊕ | CLOUDARC MARKETING BUDGET PLAN | | | | | | |
|---|---|---|---|---|---|---|---|
| FILES ON DROPBOX | LAST UPDATED: 8/31/12 | | | | | | |
| 📄 CLOUDARC MARKETING BUDGE... <br>25 KB, MODIFIED ON 11/07/2012 09:06AM | | JAN | FEB | MAR | APR | MAY | JUN |
| | PERSONNEL | | | | | | |
| | SALARIES, WAGES | 10 | 12 | 14 | 16 | 18 | 18 |
| 📄 EXPENSE TRACKING.PDF <br>207 KB, MODIFIED ON 11/07/2012 09:06AM | BENEFITS | | | 10 | | 10 | |
| | PAYROLL TAXES | | 10 | | 10 | | 10 |
| 📄 PURE MOBILITY NEWSLETTER VO... <br>2 MB, MODIFIED ON 11/07/2012 09:05AM | COMMISSIONS AND BONUSES | | 5 | | | | |
| | PERSONNEL TOTAL | $10 | $27 | $24 | $26 | $28 | $28 |
| 📄 PURE MOBILITY NEWSLETTER VO... <br>2 MB, MODIFIED ON 10/12/2012 05:56PM | MARKET RESEARCH | | | | | | |
| | PRIMARY RESEARCH | | | | 10 | | |
| | SECONDARY RESEARCH | 10 | 10 | 10 | | 10 | 10 |
| 📄 TECHFOCUS.DOCX <br>379 KB, MODIFIED ON 11/07/2012 09:06AM | MARKET RESEARCH TOTAL | $10 | $10 | $10 | $10 | $10 | $10 |
| | MARKETING COMMUNICATIONS | | | | | | |
| | BRANDING | | | | | | |
| | ADVERTISING | 40 | 40 | 45 | 45 | 45 | 45 |
| | WEB SITES | | | | | | |
| | DIRECT MARKETING | 22 | 22 | 22 | 22 | 22 | 22 |
| | INTERNET MARKETING | 34 | 36 | 36 | 36 | 34 | 25 |
| | COLLATERAL | 5 | 5 | 5 | 5 | 5 | 5 |
| | PUBLIC RELATIONS | 25 | 25 | 25 | 25 | 25 | 25 |
| | ANALYST RELATIONS | | | | | | |
| | EVENTS | | 45 | | | 35 | 45 |
| | MARKETING COMMUNICATIONS TOTAL | $126 | $173 | $133 | $133 | $166 | $167 |
| | CHANNELS | | | | | | |
| | CHANNEL COMMUNICATIONS AND TRAINING | | | | | | |
| | CHANNEL PROMOTIONS AND INCENTIVES | 10 | 10 | 10 | 10 | 10 | 10 |
| | CHANNEL COMMISSIONS/BONUSES | | | | | | |
| | CHANNELS TOTAL | $10 | $10 | $10 | $10 | $10 | $10 |
| | CUSTOMER ACQUISITION & RETENTION (CAR) | | | | | | |
| | LEAD GENERATION | 21 | 23 | 26 | 34 | 33 | 35 |
| | CUSTOMER LOYALTY | 10 | | | | | 10 |
| | CAR TOTAL | $31 | $23 | $26 | $34 | $33 | $45 |
| | OTHER | | | | | | |
| | POSTAGE | | | | | | 10 |
| | TELEPHONE | | 10 | 10 | 10 | | |
| 🎯 🕐 ☆ 💬 <br>ALL RECENT FAVORITES NOTIFICATIONS | TRAVEL | 10 | 15 | 15 | 15 | 15 | 10 |
| | COMPUTERS AND OFFICE EQUIPMENT | | | | | 10 | |
| | OTHER TOTAL | $10 | $25 | $25 | $25 | $25 | $20 |
| | TOTAL MARKETING BUDGET | $197 | $268 | $228 | $238 | $272 | $280 |

FIG. 32

USER INTERFACE FOR SECURE VIRTUAL DOCUMENT MANAGEMENT SYSTEM

RELATED APPLICATIONS

This application claims priority to U.S. Provisional Patent Application No. 61/725,004, entitled USER INTERFACE FOR SECURE VIRTUAL DOCUMENT MANAGEMENT SYSTEM filed Nov. 11, 2012.

This application is a continuation in part application of co-pending U.S. patent application Ser. No. 13/734,525, entitled SECURE VIRTUAL FILE MANAGEMENT SYSTEM, filed Jan. 4, 2013, which claims priority to U.S. Provisional Patent Application No. 61/584,112, entitled CLOUD CONTENT EXCHANGE SERVICE, filed Jan. 6, 2012; U.S. Provisional Patent Application No. 61/724,966, entitled SECURE VIRTUAL DOCUMENT MANAGEMENT SYSTEM, filed Nov. 10, 2012; U.S. Provisional Patent Application No. 61/725,004, entitled USER INTERFACE FOR SECURE VIRTUAL DOCUMENT MANAGEMENT SYSTEM, filed Nov. 11, 2012; and U.S. Provisional Patent Application No. 61/725,007, entitled SECURE VIRTUAL DOCUMENT MANAGEMENT SYSTEM, filed Nov. 11, 2012, all of which are incorporated herein by reference for all purposes.

TECHNICAL FIELD

The embodiments described herein relate to user interface controls for an application running on a mobile device and providing mobile device users control of enterprise content across and among content storage locations including on-premise content management systems, cloud based enterprise content management systems, and cloud based storage services. The embodiments provide secure access from mobile devices to content across these locations while enforcing policies and monitoring/tracking/controlling mobile device use of managed content.

BACKGROUND

Averail Cloud Content Exchange ("CloudXchange" or "ACXS") service, also referred to herein as Averail or the Averail system, is a cloud-hosted service that provides secure access from mobile devices (smartphones and tablets) to an aggregated set of on-premise Enterprise Content Management ("ECM") and/or storage systems and cloud storage services, as described in detail in the Related Applications. There is a need for a user interface for the cloud-hosted service that provides secure access from mobile devices (smartphones and tablets) to an aggregated set of on-premise Enterprise Content Management ("ECM") and/or storage systems and cloud storage services.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 14 shows the landing page of a user who has selected "financials" from the My Access folder view, under an embodiment.

FIG. 27 shows example of manage mode in a SharePoint view folder, under an embodiment.

FIG. 32 shows documents within a DropBox container under an embodiment, under an embodiment.

DETAILED DESCRIPTION

Averail Cloud Content Exchange ("CloudXchange" or "ACXS") service, also referred to herein as Averail or the Averail system, is a cloud-hosted service that provides secure access from mobile devices (smartphones and tablets) to an aggregated set of on-premise Enterprise Content Management ("ECM") and/or storage systems and cloud storage services. These ECM and cloud storage services can include on-premise SharePoint, Office 365 with SharePoint Online, Dropbox, iCloud, Google Docs and Box.Net.

Figure 1:
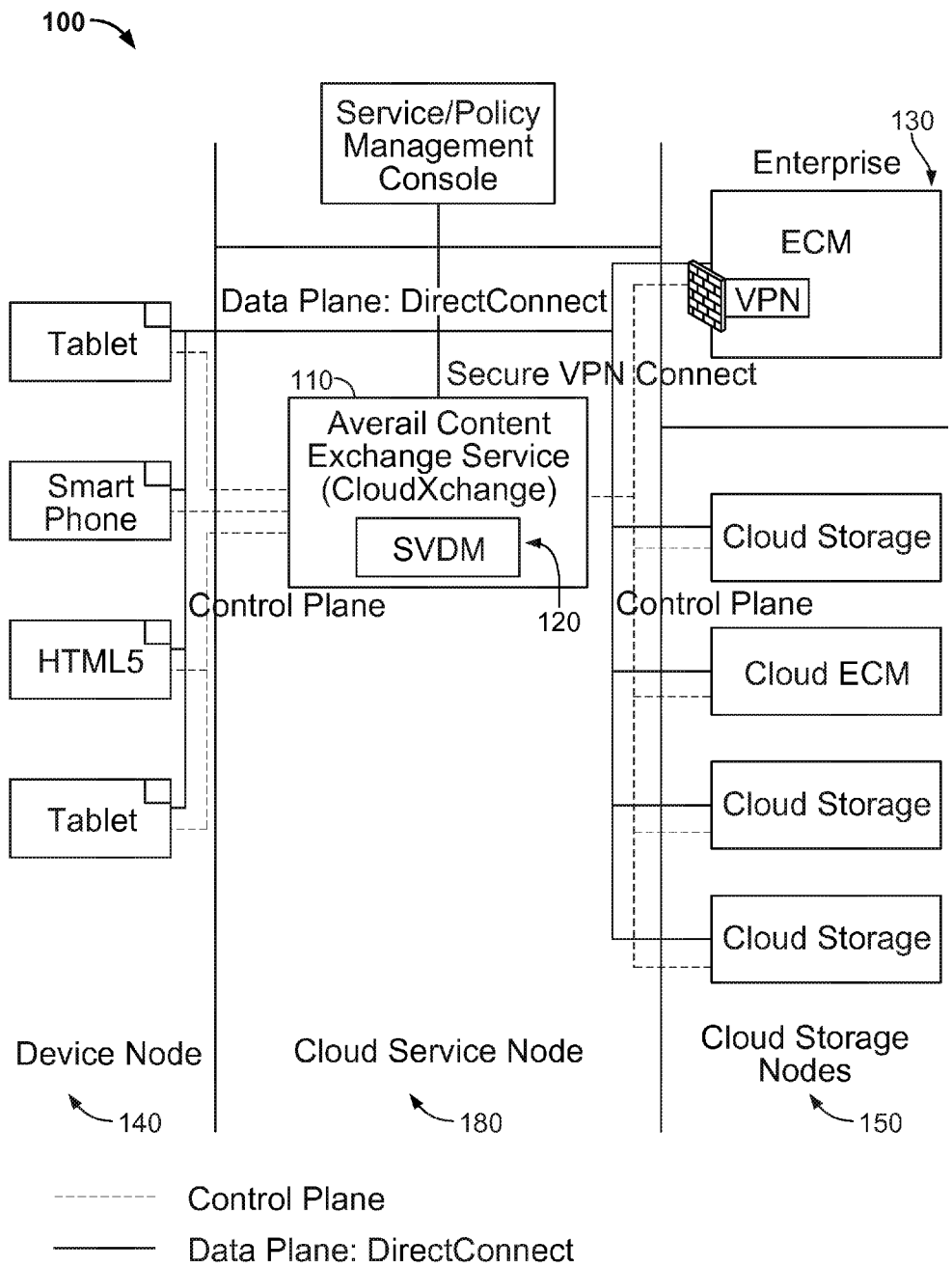
FIG. 1 is an example of an end-to-end view of the ACXS service, under an embodiment.

FIG. 1 is a example of an end-to-end view of the ACXS service. The figure shows a device node 140, a cloud storage node 150, an enterprise node 130 and a cloud service node 180. The device node 140 includes one or more of a smartphone, a tablet or a web browser client. A smartphone device may includes an iPhone device running iOS, an Android device running the Android operating system or a Windows phone running the Windows operating system. A tablet device may include any mobile tablet platform running any one of the above referenced operating systems (for example, the iPad running iOS). The enterprise node 130 includes enterprise content management services including Windows Server Active Directory, and Microsoft SharePoint. The enterprise node may also include local shared drive solutions that provide shared access to enterprise content/files. Such systems include Network File System, Distributed File System, and/or Server Message Block (SMB), also known as Common Internet File System (CIFS). The cloud node 150 includes cloud based storage services and/or applications including Dropbox, iCloud, Google Docs and Box.Net. The cloud node 150 also includes cloud hosted enterprise content management solutions such as Microsoft Office 365. The device node 140, cloud storage node 150, and an enterprise node 130 are coupled to the cloud services node 180. The cloud services node includes the ACXS cloud based service 110 hosted in a public or private cloud under an embodiment. The smartphone, tablets and web browser as seen in FIG. 1 run instances of the Averail application that broker user communications with enterprise and cloud content through the ACXS service.

The Averail cloud based service implements a cloud based secure virtual document management service 120 ("SVDM") as described in greater detail below. In the descriptions and embodiments set forth below, the SVDM system may be referred to as the ACXS SVDM service, the Averail CloudXchange service or ACXS service. One skilled in the art will understand that the ACXS cloud based service in cooperation with the Averail mobile application provides the core functionality of the secure virtual document management system Accordingly, the SVDM system may therefore at times be used interchangeably with the terms ACXS SVDM service, the Averail CloudXchange service or ACXS service.

The SVDM implements a suite of encryption and policy control solutions across a plurality of traditionally siloed storage services, ECM systems and applications. The Averail CloudXchange service is a secure virtual document management system that is cloud-hosted service and provides secure access from mobile devices (smartphones and tablets) to a federated set of on-premise ECM/storage system and cloud storage services. These ECM and cloud storage services can include on-premise SharePoint, Office 365 with SharePoint Online, Dropbox, iCloud, Google Docs, Google Drive and Box.Net. Each such ECM and cloud storage domain integrated within the Averail system is referred to as a storage domain.

The Averail system includes a mobile device node comprising mobile devices, tablets and/or web clients. The mobile devices include the Averail mobile application running on iOS, Android, Windows Phone and Windows 8 platforms. The Averail system includes a cloud based node which implements the Averail CloudXchange service (ACXS). The cloud based ACXS is deployed and operated on public and/or private cloud computing platforms. The Averail ACXS service uses the primitives and services of an underlying cloud based computing platform. As one example these underlying services may include computing, storage, relational databases, structured and blob storage stores, and virtual private cloud services The Averail end-to-end system further includes an enterprise node environment containing enterprise applications, ECM systems, file storage systems, Active Directory domain/federation servers and VPN appliances. Finally the Averail system includes one or more cloud storage services and ECM systems. Examples include Box.net, Dropbox, iCloud, Office365.com, Google Docs, and Microsoft SkyDrive etc.

Each node represents an architected collection of subsystems and components that provides a defined set of services and functionality as part of the overall system. A node connects and interfaces (using different technologies—for example, REST web services interfaces over HTTP between Averail mobile application and ACXS cloud service) with one or more other nodes to define the overall end-to-end architecture. The system architecture specifies the normative reference architecture for each node, interfaces and interactions across nodes and the entire end-to-end system. This reference architecture can be realized using different software technologies (for example: Amazon AWS or Windows Azure can be the underlying cloud computing platform, public or private cloud) and conforms to the overall system requirements and architecture framework.

The ACXS architecture described below focuses on both logical model and physical deployment models. Depending on the scale of the Averail services, logical components can be deployed in different physical topologies and configurations. The AXCS service maintains a logical data model for each enterprise customer of the Averail service. The logical data model includes a federated identity model, a policy and authorization model, a federated content forest model, and a device management model. The ACXS service combines information from the logical data models (on a per customer basis) to perform its cloud-side part of the functionality related to federation of cloud storage and on-premise ECM, secure content management, policy management and enforcement, and monitoring, reporting and analytics. The identity model includes the user's Averail identity and credentials, the user's associated device(s) unique identifier(s), and user identity and credentials for each federated storage domain. The federated content forest model maintains a metadata-based forest of storage domains (a storage domain is either a federated ECM or cloud storage system) and corresponding content hierarchy. The device management model includes data for all user devices enrolled and managed for an enterprise customer as part of the Averail service. Device data includes information about the configuration and settings of all devices, device posture, and device management policies defined by that customer for its set of devices. A Policy and Authorization Model under an embodiment. includes information of policies and permissions. The Averail service administrator uses a service management application/console to define security policies/definitions that are applicable to the Averail managed storage domains. Averail CloudXchange service stores these policies in an underlying secure policy store. The Averail system implements broad classes of management policies including information management, collaboration and sharing, compliance and auditing, cross-domain routing across storage domains, synchronization, mobile application-specific policies, device management policies, and/or information rights management policies. The policy and authorization model also inherits policies from federated storage domains. The requirement is to ensure that inherited policies are always enforced and cannot be overridden (but may be augmented) by Averail-specific policies. CloudXchange service also models groups and permissions for both those inherited from storage domains, Active Directory and those defined within Averail context under an embodiment.

The Averail service stores content metadata (accessed from its federated storage domains and ECM domains), permissions and policies definitions securely in its databases and structured storage. The Averail mobile application can access this information using secure and trusted REST interfaces exposed by ACXS service. However, any access and operations on the content from mobile device itself happen directly between the application on the mobile device and storage domain services.

Figure 2:
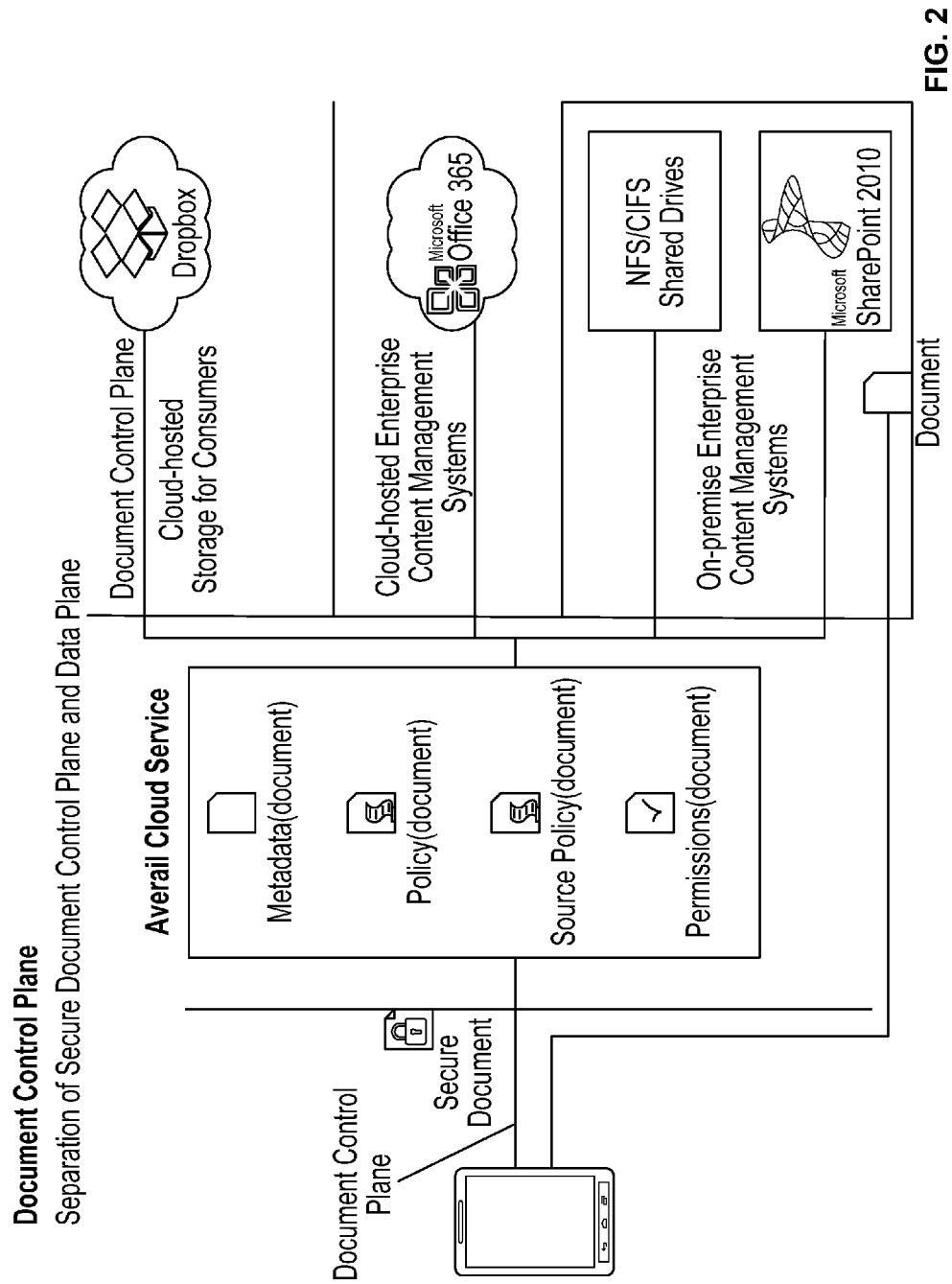
FIG. 2 is an example of the ACXS implemented control plane, under an embodiment.

FIG. 2 is an example of the ACXS implemented control plane under an embodiment. The ACXS maintains (in ACXS cloud based storage) document metadata, policy document, source policy document and a permissions document. Under one embodiment the policy and permissions documents store policy and permission definitions created by an administrator through a policy management console coupled to the ACXS. Under this embodiment, the source policy document inherits policies and permissions from a source storage domain, e.g. policies and permissions administered by SharePoint at an enterprise level. As seen in FIG. 2, the ACXS service secures or contains documents on the control plane by supervising a document control plane. As one example, enterprise content is transferable to a mobile device and further to cloud based storage locations if allowed by "control plane" policies. However, direct access and operations on the content from the mobile device itself happens directly between the Averail application on the mobile device and storage domain services.

Figure 3:
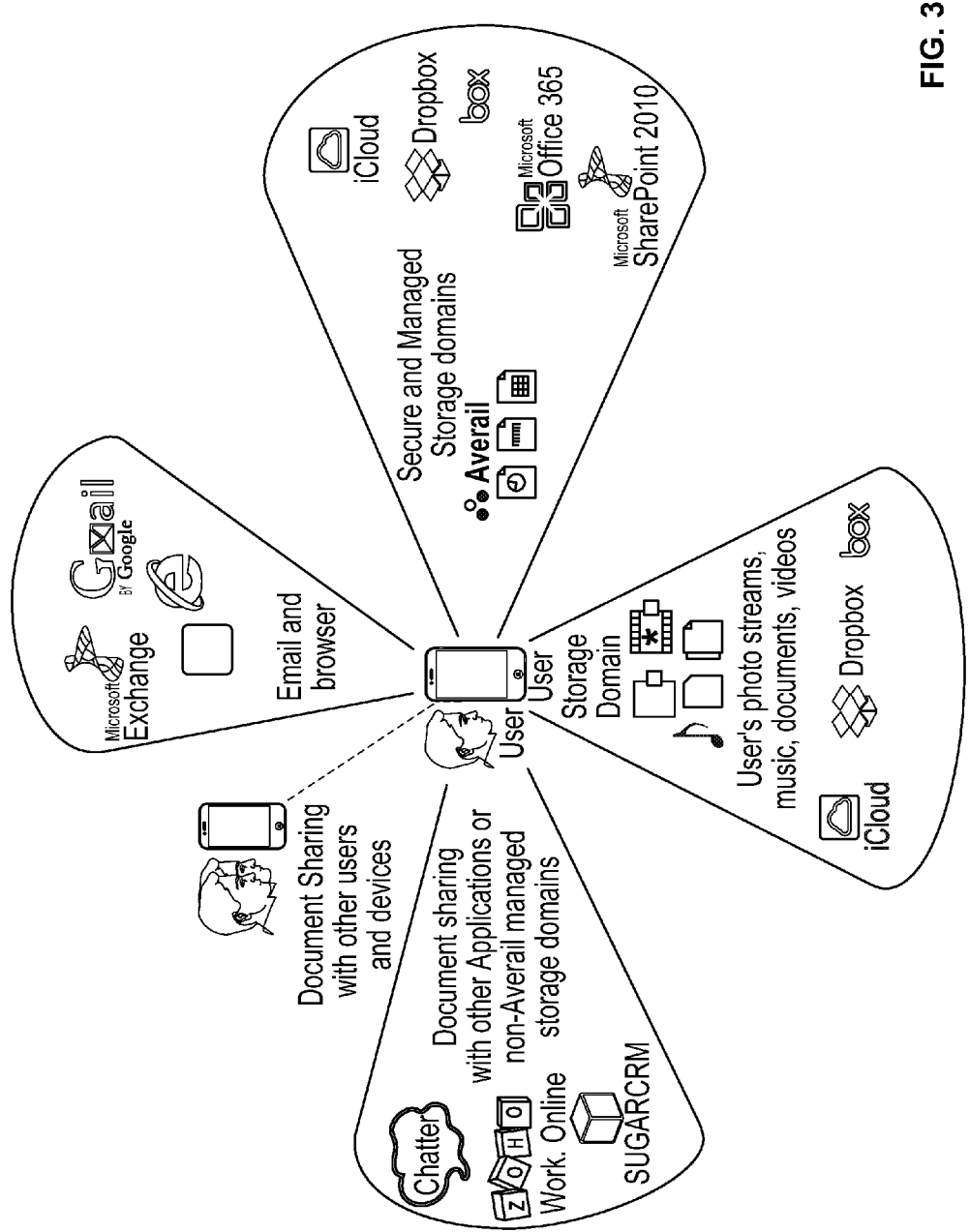
FIG. 3 is a description of Averail managed containers, under an embodiment.

FIG. 3 is a description of Averail managed containers under an embodiment. As seen in FIG. 3, Averail provides the notion of a secure and managed storage/content management container to the mobile device users. This managed container provides secure environment for access/sharing/collaboration of documents from multiple federated storage domains, enforces policies and permissions (as inherited from source storage domains and policies defined through ACXS service) and prevents document leakage. FIG. 3 shows a number of storage domains and applications available to the user. Mobile device user may store content among a plurality of locations. For example, user storage domains include iCloud, Dropbox and box.

The Averail system provides a managed storage/content management container to the mobile device user. The managed container under an embodiment includes a combination of cloud based storage services, cloud based ECM services (Microsoft 365) and on-premise ECM services (SharePoint). While a user can continue to store and manage personal content (music, videos, photos, documents) from a smartphone or tablet onto cloud storage/ECM service of his/her own choice, Averail ensures that any content (that is stored or imported into underlying federated cloud storage and/or on-premise ECM services) within the Averail domain is secure and adheres/complies to policy and permissions defined by enterprise content administrators and Averail service administrators.

Under the SVDM concept and service, the user has the option to import or move documents from other applications on the device into the Averail managed domain and make these Averail managed documents. User can share Averail-managed documents with other users and devices directly via the Averail service or indirectly via $3^{rd}$ party applications (Chatter, Zoho, Google Apps) provided policies and permissions allow such sharing. If user shares content or exports content from Averail managed domain with other users/applications, then the content is still managed as per requirements (example: audit trail), policy and permissions for Averail managed domain. For example, if Averail document sharing policy doesn't allow an Averail managed document to be shared with an anonymous user, Averail enforces that policy on document sharing. Under an embodiment, the ACXS system provides cross-domain routing across storage domains. Given that Averail service federates multiple cloud storage and ECM services, a user has the option of copying/moving or do export/import (for example: "Open in . . . " on iPhone or iPad moves the document to local sandboxed file system of the target application) of the content across these storage domains. For example, a user can move a document from on-premise SharePoint site (that doesn't allow external access to non-employees) to Box.Net so that user can provide access to this document to a customer. However, such cross-domain routing is subjected to policies and permissions defined within the Averail service. The SVDM system under an embodiment restricts cross-domain routing across and among cloud and ECM locations including iCloud, Dropbox, Box, Microsoft Office 365 and SharePoint.

The Averail service provides security for data at rest for documents on both mobile device and federated ACXS cloud storage. Averail services enable service administrator and mobile users to set policy to ensure that any content stored on public cloud storage services is always encrypted using keys managed and controlled by either the user or Averail customer. Given Averail CloudXchange service of an embodiment is not on the data plane, the content encryption and decryption happens on the mobile device by Averail mobile applications. Also, SSL/TLS is used during communication between device and cloud storage service. The goal is to ensure that content is never in clear either at rest or in transit as it goes from device to public cloud storage services.

As seen in FIG. 1, the mobile devices within the mobile node of the Averail system run the Averail mobile application. Under an embodiment, the Averail mobile application uses rich platform-specific mobile application or an HTML5 application to access Averail services for secure mobile content access and management, cloud storage aggregation and document collaboration. With respect to mobile devices and tablets, the mobile applications are platform-specific native mobile applications distributed through public app stores or enterprise app stores. Averail supports iOS (for iPhone and iPad), Android (tablet & phone) and Windows Phone applications. The Averail application may also run as an HTML5 application that can be accessed using HTML5 capable browser. Note that HTML5 mobile applications may have limitations including limitations in terms of device native UX, local storage and access to native OS APIs for encryption.

The Averail application provides users an easy to use UX to access Averail services and its federated set of ECM and cloud storage services without introducing complexities related to service administration and policy definition functions. A user can perform at least the following functions using the Averail mobile application.

The Averail application provides capability to view, edit, create and manage content hierarchy (document libraries, folders etc.), metadata and content itself The Averail application provides capability to export document from Averail mobile application to other viewer and collaboration/email applications, under an embodiment.

The Averail application provides capability to import document from other applications to Averail application, under an embodiment.

The Averail application provides capability to share across multiple storage domains securely, under an embodiment.

The Averail application provides capability to share documents across standard/custom groups and users, under an embodiment.

The Averail application provides capability to search for document within/across folders, sites and storage domains, under an embodiment.

The Averail application provides capability to manage and tag items for offline access, under an embodiment.

The Averail application provides capability to subscribe to notifications or alerts for conditions/events related to content, folders, sharing, workflow or system events, under an embodiment.

As indicated above, Averail provides an Averail application specific to mobile devices running iOS, Android or Windows mobile device operating systems. The Averail system additionally provides a web based browser interface to an Averail HTML5 application. The following description of an Averail application interface includes a description of the Averail application as presented on an iPad running the application in an iOS environment. However, embodiments of the application interface as implemented in iOS, Android and/or Windows based operating systems and/or through WebUX are not so limited. In the interface description below, the Averail application as implemented on an iPad device may be referred to as the Averail Access application or Averail Access user interface but embodiments are not so limited.

Figure 4:
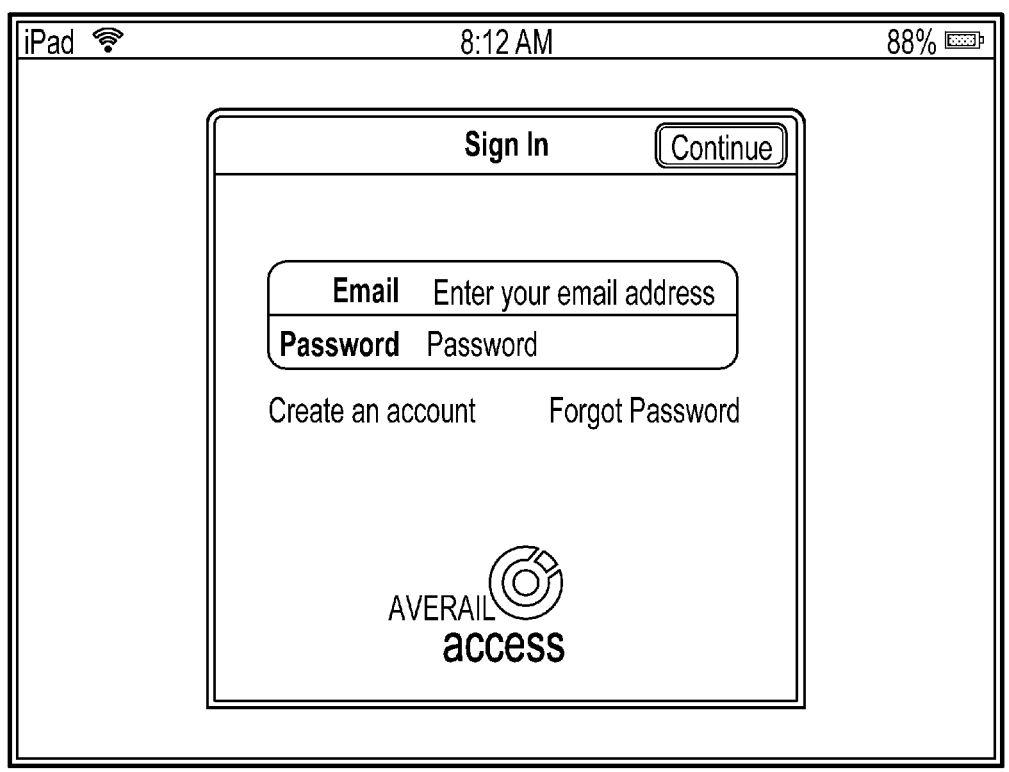
FIG. 4 is an Averail system sign in screen/page, under an embodiment.

FIG. 4 is an Averail system sign in screen/page under an embodiment. The displayed screen shows fields for a user to supply an email address and password. The screen also shows a "create an account" link and a "forgot password" link that when selected lead to the respective screens for creating an account and recovering a password.

Figure 5:
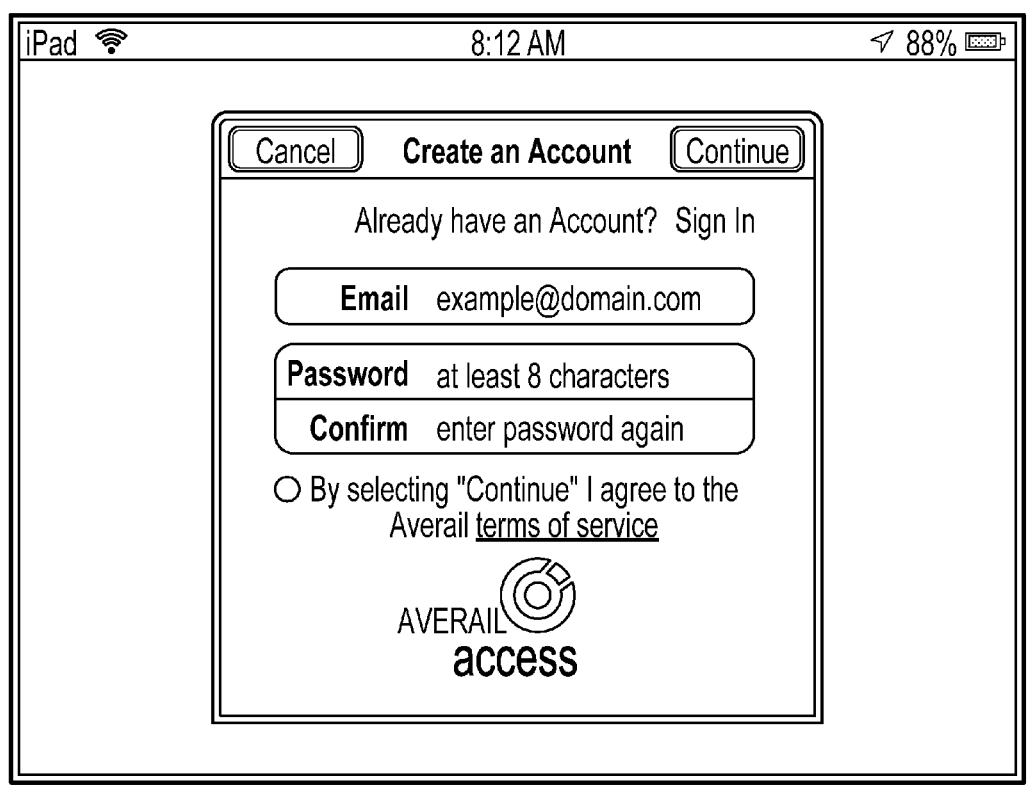
FIG. 5 is a screen allowing a user to create an account, under an embodiment.
Figure 6:
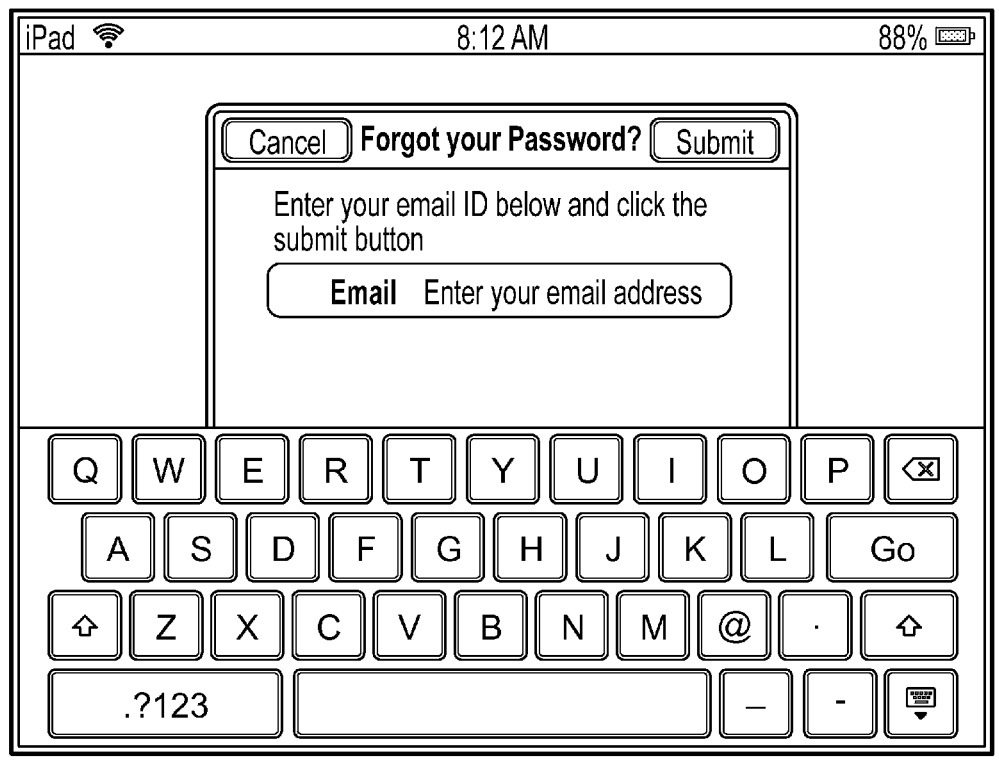
FIG. 6 presents user a recover a password panel, under an embodiment.

FIG. 5 is a screen allowing a user to create an account under an embodiment. The user navigates to the "Create an Account" page by selecting the corresponding link on the sign in page. The screen enables user creation of an Averail Access account by providing email and password entry fields. In addition to submitting email and password, the "Create an Account" page requests a duplicate entry of the password in order to confirm user's password selection. A radio button below the user/password field forces a user to acknowledge terms of service prior to account creation. Users with an account may bypass the page by selecting the "sign in" link at the top right of the page. FIG. 6 presents user an option to recover a password under an embodiment. The user navigates to the "Forgot your Password?" page by selecting the corresponding link on the sign in page. Using the displayed interface, the user enters the user's email address and then receives further direction via direct communication from Averail to recover or reset password.

Figure 7:
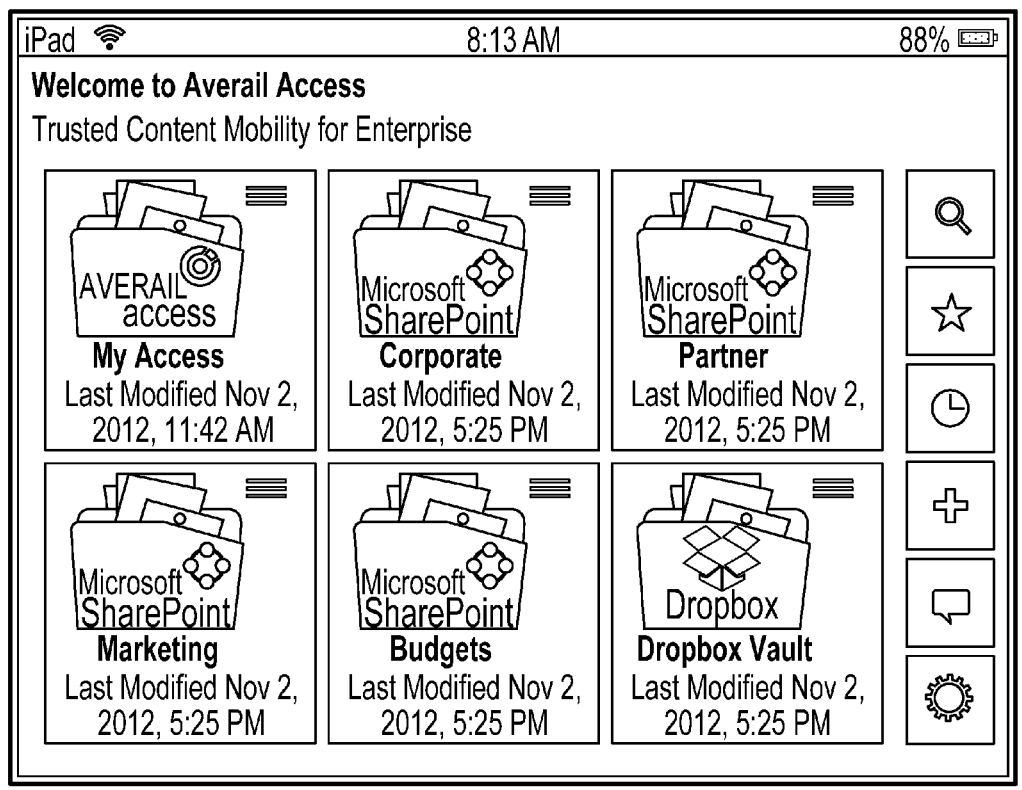
FIG. 7 is an Averail workspace/dashboard, under an embodiment.

FIG. 7 is an Averail workspace under an embodiment. The Averail application uses a dashboard or workspace concept that organizes content into folders that are readily accessible to users on an iPad. Each folder may correspond to a different content domain. For example, a folder may correspond to a Dropbox account or a distinct corporate SharePoint site (or subsite, library or folder). Users can define many folders and once the main screen is full, users may swipe to reveal additional folders to the right. The dashboard of FIG. 7 displays "My Access", "Microsoft SharePoint" and "DropBox" folders but embodiments are not so limited. Each displayed SharePoint folder corresponds to a Sharepoint "site" including SharePoint Sites, Site Collections, SubSites, Libraries, and Folders. As seen in FIG. 7, SharePoint folders correspond to sites including corporate, partner, marketing, and budget sites but embodiments are not so limited. A details icon is located to the upper right of each dashboard folder (comprising three parallel horizontally stacked bars) and when activated displays configuration details for each folder.

Figure 8:
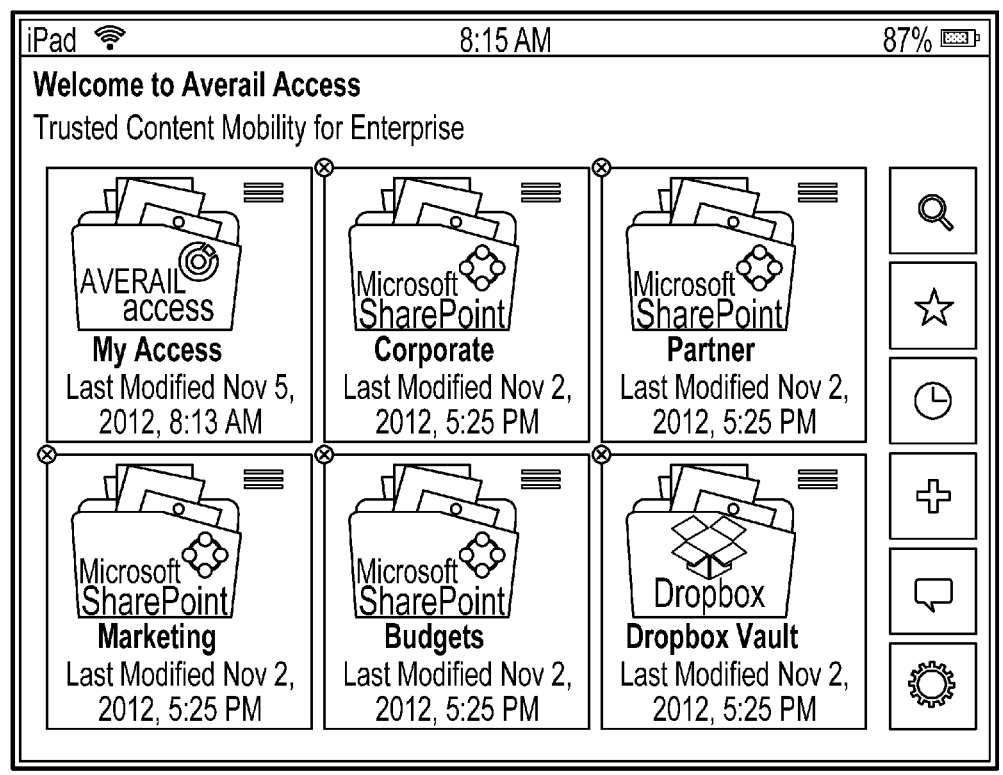
FIG. 8 shows Averail workspace/dashboard with container delete option enabled, under an embodiment.

To assist in navigation and feature actions, the Averail system implements menu items along the right side of the display. The menu items from top to bottom include search documents, favorites, recent documents, add site, notifications, and settings. The menu items and related interfaces and/or functionalities associated with each such menu item are described in greater detail below. Users may add, delete and modify folders or site information from the Dashboard screen. Press and hold permits a user to show the Delete icon on an item on the Dashboard as seen in FIG. 8.

Figure 9:
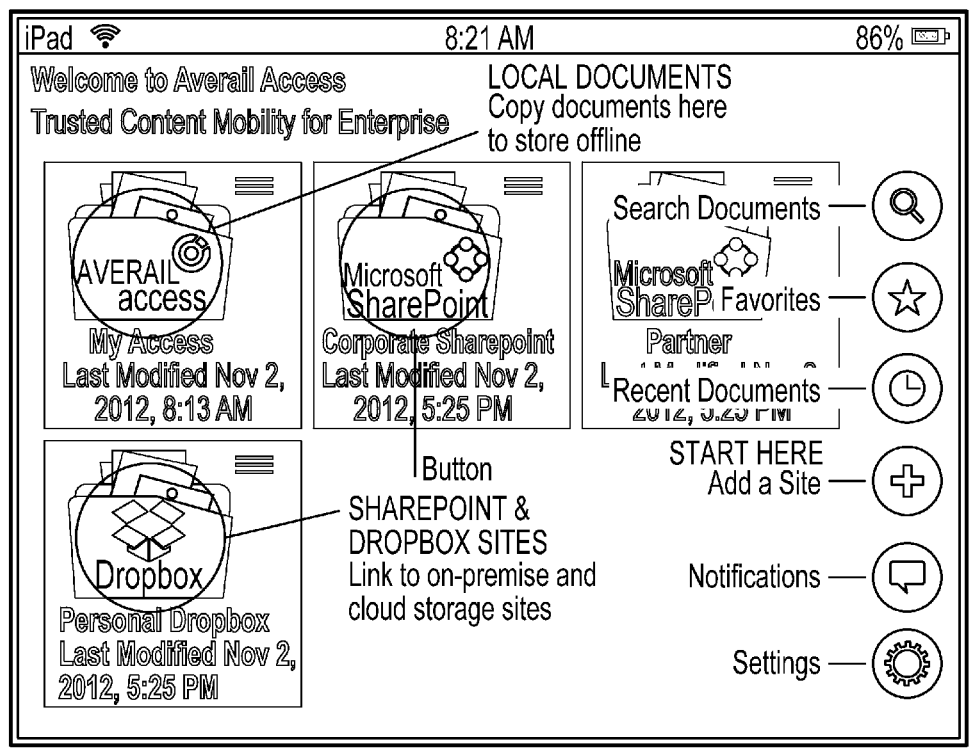
FIG. 9 shows an Averail workspace/dashboard, under an embodiment.

FIG. 9 shows an Averail Access Dashboard under an embodiment. As seen in the figure, the user may copy documents to the My Access folder to store documents offline. The Dashboard in FIG. 9 shows a SharePoint folder and a Dropbox folder. The SharePoint folder provides user a link to on-premise content management system SharePoint site(s) or cloud hosted Office 365 site(s). The Dropbox folder provides a user with access to content stores on a cloud storage site. As already indicated above, FIG. 9 shows the menu items along the right side of the display together with labels. The menu items (further described below) include search documents, recent documents, favorites, add site, notifications, and settings.

Figure 10:
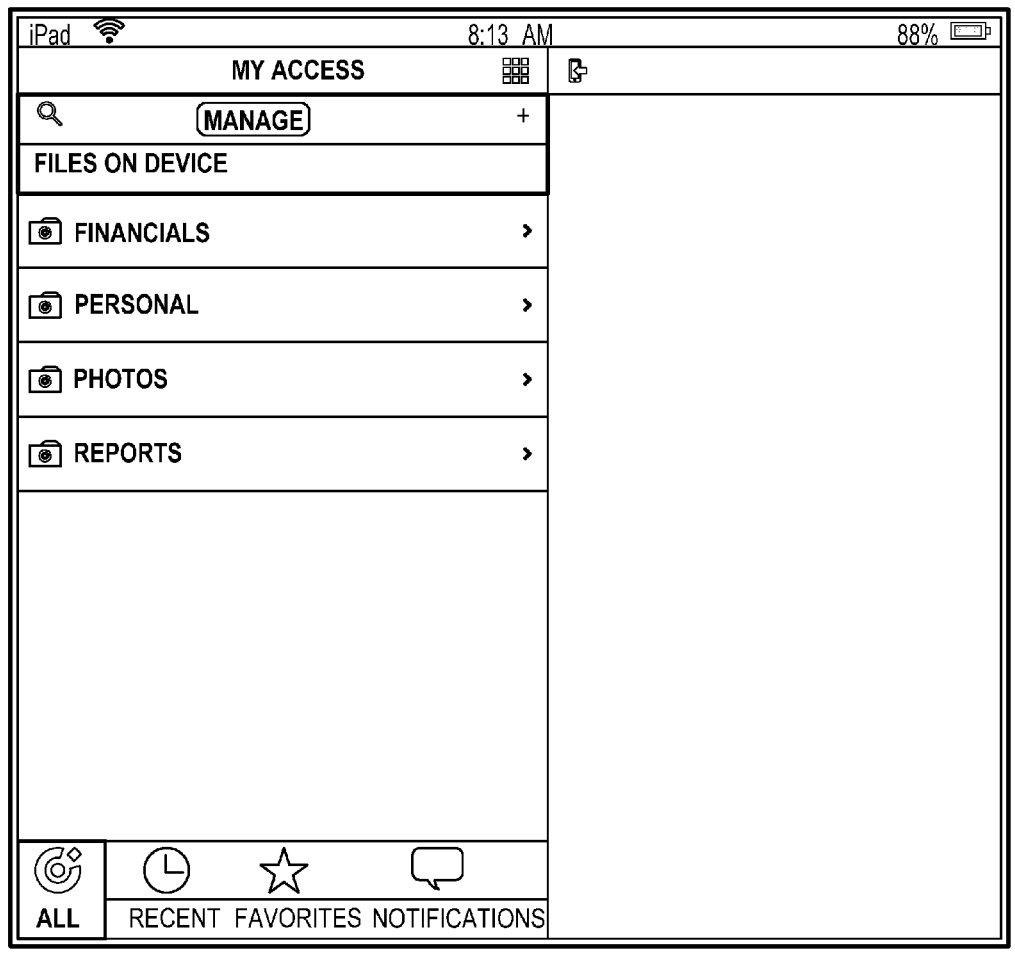
FIG. 10 is a My Access folder view, under an embodiment.

The Averail dashboard of FIG. 7 includes a My Access folder under an embodiment. The My Access Folder is a folder for a user to manage, view, browse and open files locally on the mobile device. The user opens the My Access folder by tapping it from the Dashboard. When opened, the My Access folder view displays a list of files and folders along the left side of the screen. FIG. 10 is a screen shot of the My Access folder view under an embodiment. The folder view occupies a left justified column portion of the screen with a width approximately one third the width of the overall screen view. An upper portion of the folder view includes a search item/button, a manage button, and an add file item/button across the top of the folder view. A lower portion of the folder view includes tab view controllers including "All", "Recent", "Favorites" and "Notifications".

Figure 11:
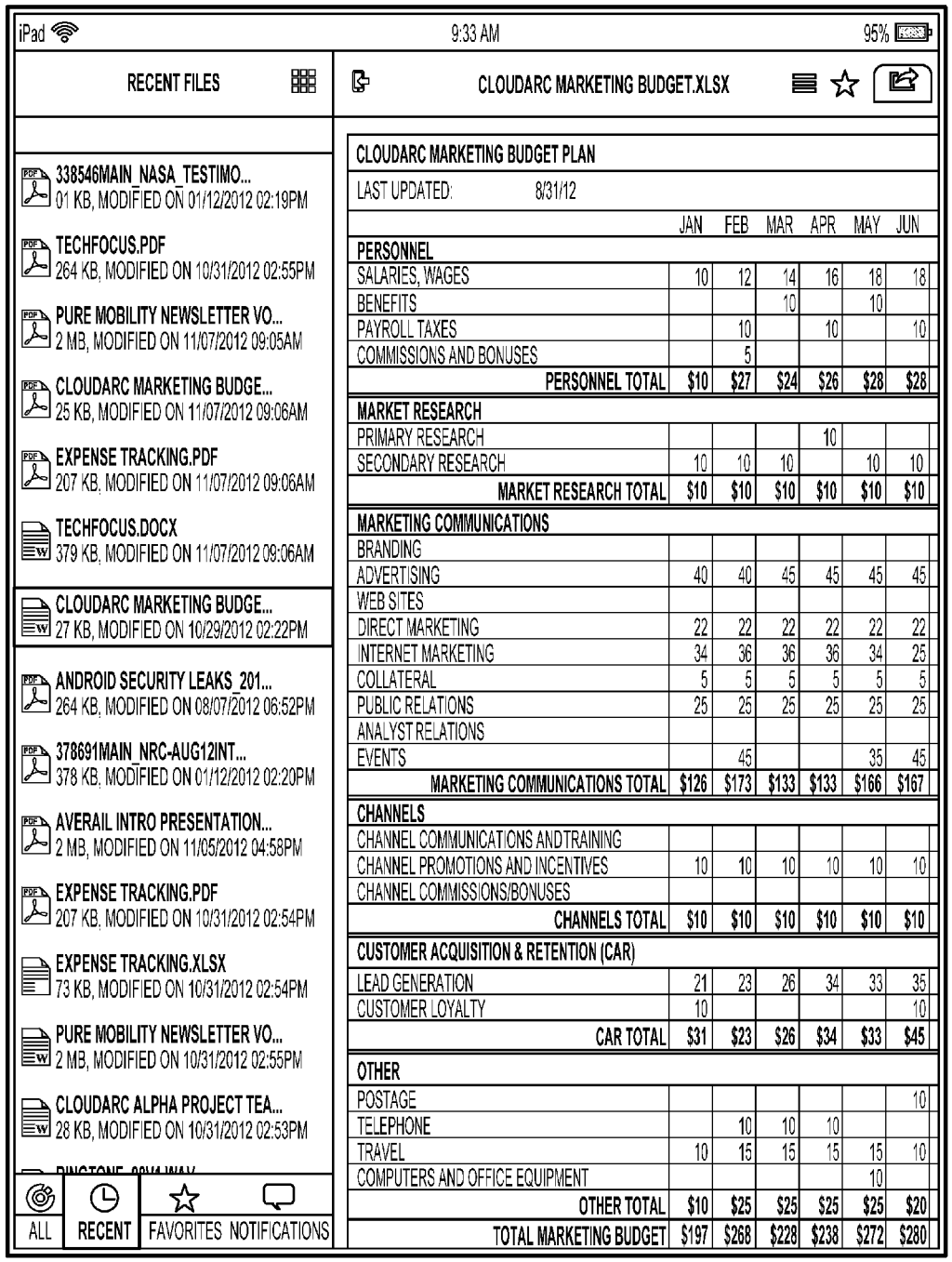
FIG. 11 is an example of a Recent files view accessed within the My Access folder view, under an embodiment.
Figure 12:
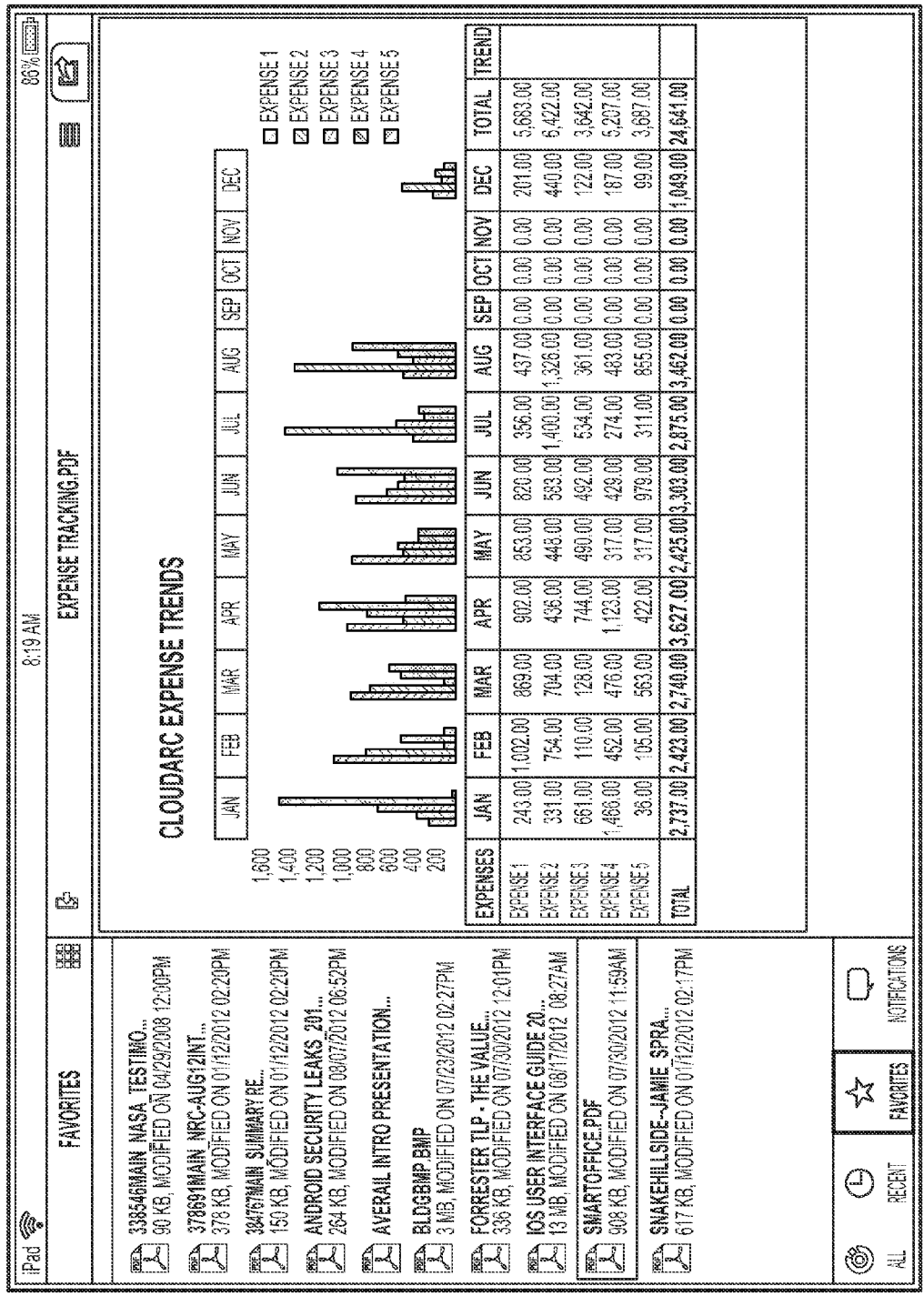
FIG. 12 is an example of a Favorites file view accessed from within the My Access folder view, under an embodiment.

A user may touch the "Recent" view tab to display a reverse chronological list of recently viewed files. A user may then select an item in the list to view or open that file. FIG. 11 is an example of a Recent files view accessed within the My Access folder view. The selected file is displayed on the right side of the screen. The user may view the file in full screen mode by selecting the expand icon to fold back the navigation panel on the left A user may touch the "Favorites" view tab to display a sorted list of files that have been explicitly marked as Favorites by user within the Averail system interface (as further described below). FIG. 12 is an example of a Favorites file view accessed from within the My Access folder view. The selected file is displayed on the right side of the screen. The user may view the file in full screen mode by selecting the expand icon to fold back the navigation panel on the left.

Figure 13:
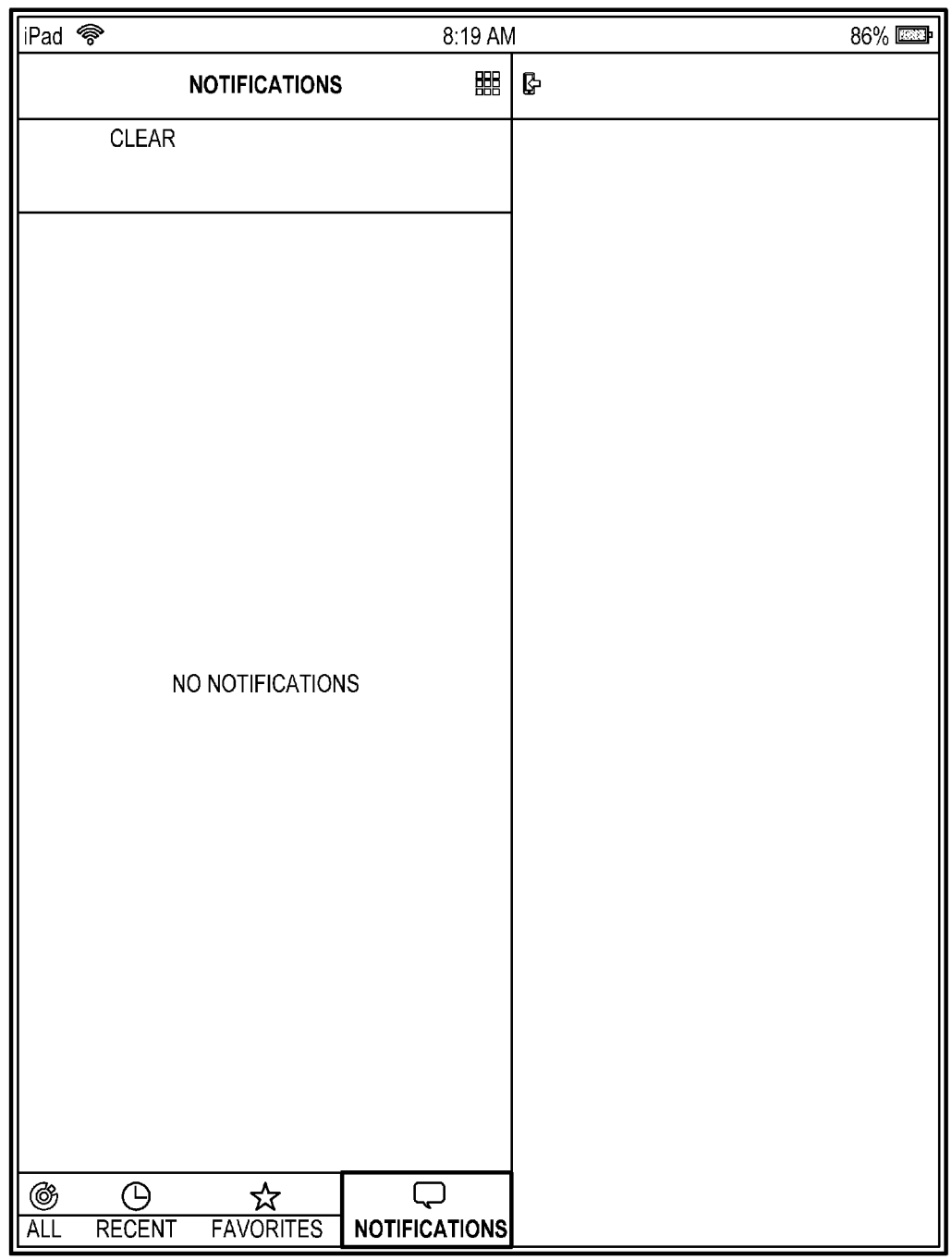
FIG. 13 is an example of a Notifications file view accessed from within the My Access folder view, under an embodiment.

A user may touch the "Notifications" tab to display a sorted list of events or messages for the user. These can be system messages such as "system downtime" or item-related messages such as "User X has shared File Y with you". Notification items may be selected to display detailed information such as time, date, filename, etc. A user may touch the "All" tab to return to the My Access folder view. FIG. 13 is an example of a Notifications file view accessed from within the My Access folder view. FIG. 13 displays no notifications under an embodiment.

Figure 14:
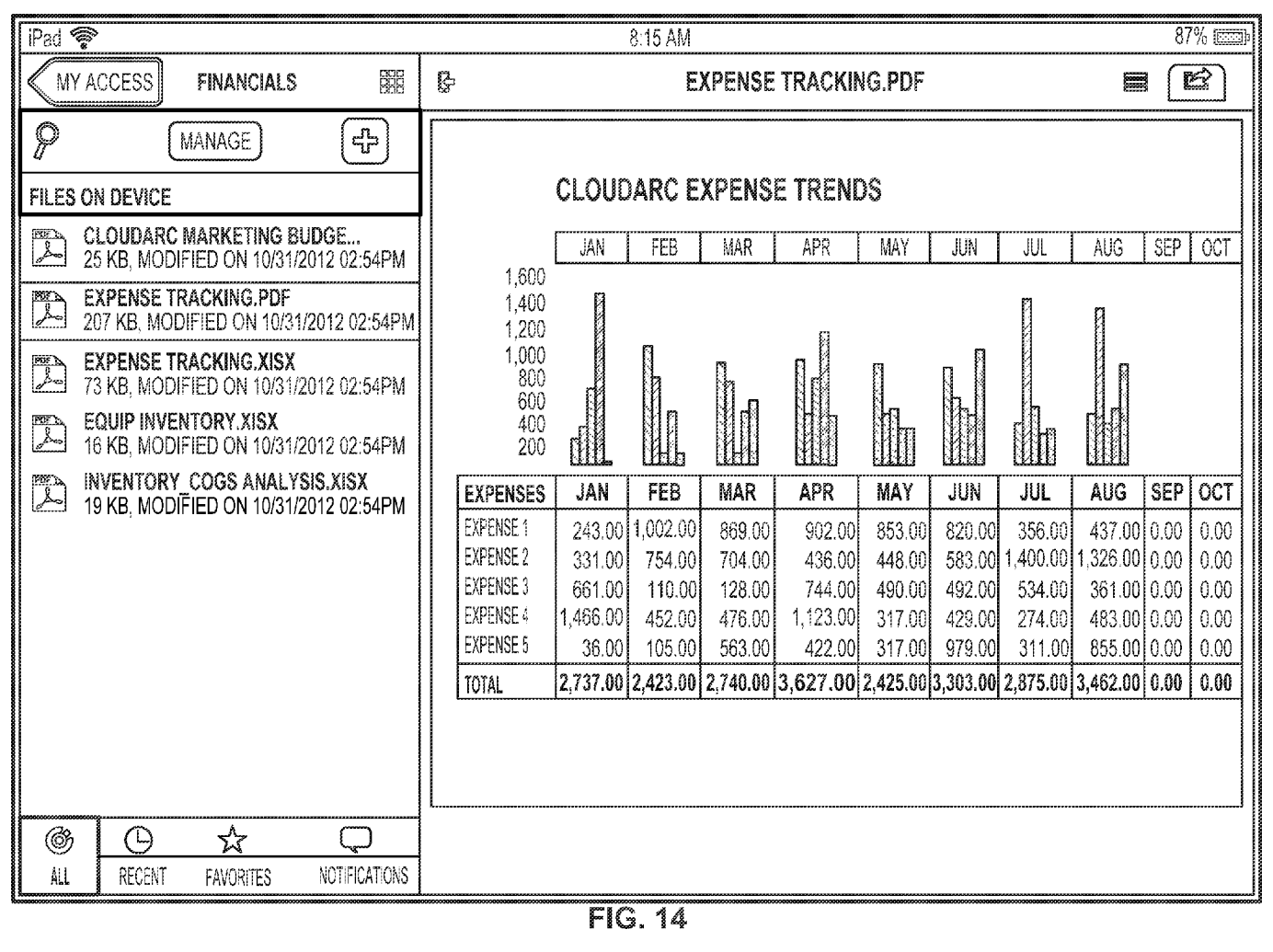
Figure 15:
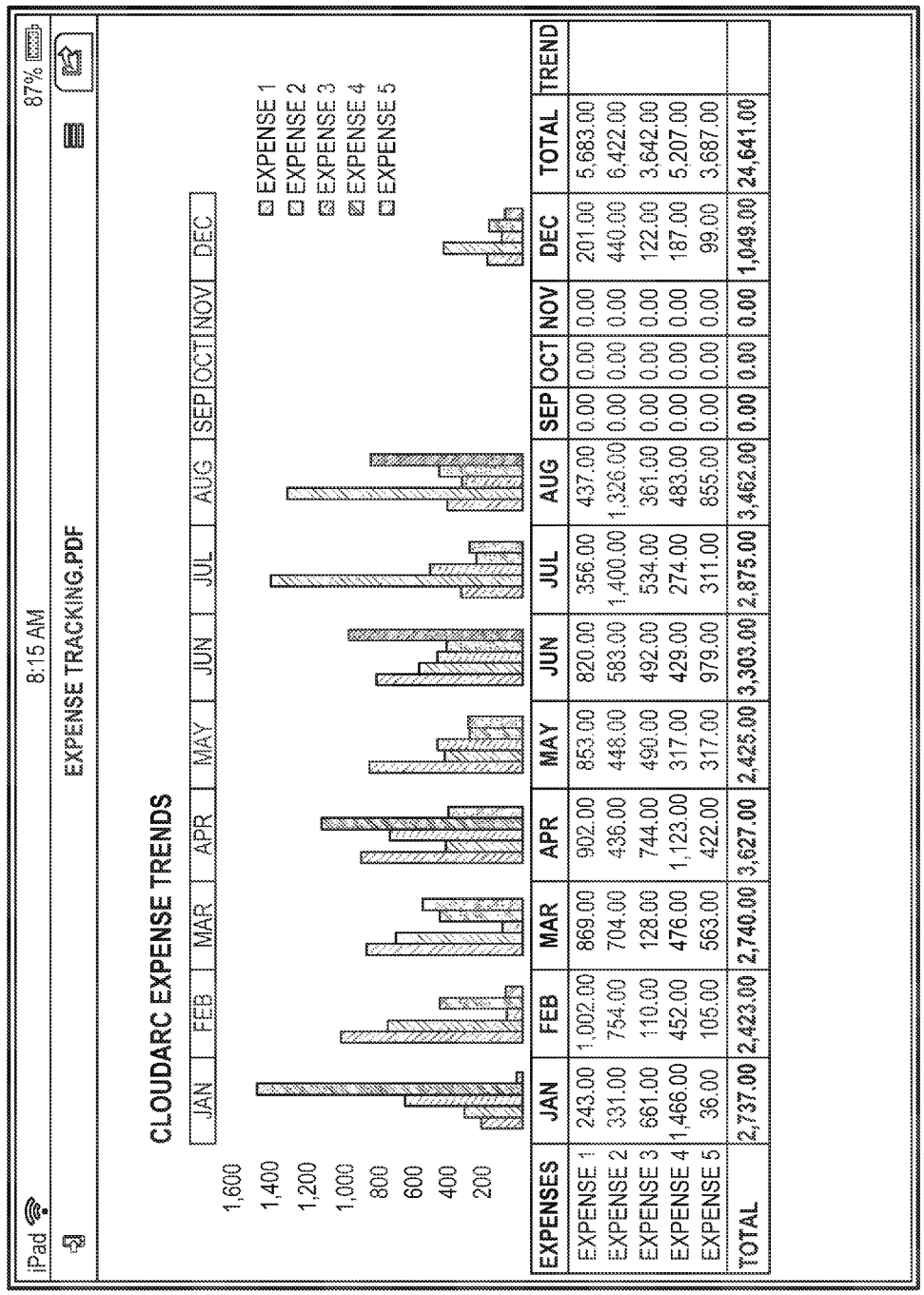
FIG. 15 shows a document displayed in full screen mode, under an embodiment.

FIG. 14 shows the landing page of a user who has selected "financials" from the My Access folder view (FIG. 10) to enter the "financials" view folder. FIG. 14 shows documents within the financials view folder under an embodiment. A user may return to previous listing of folders by selecting the "My Access" tab at the top left of the screen. A user may select a document from the document list. FIGS. 14 and 15 provide an example of selecting/viewing a document. FIG. 14 shows user selection of the "Expense Tracking.pdf" document which then displays on the right panel. The user may view the file in full screen mode by selecting the expand icon to fold back the navigation panel on the left. FIG. 15 shows a document displayed in full screen.

Figure 16:
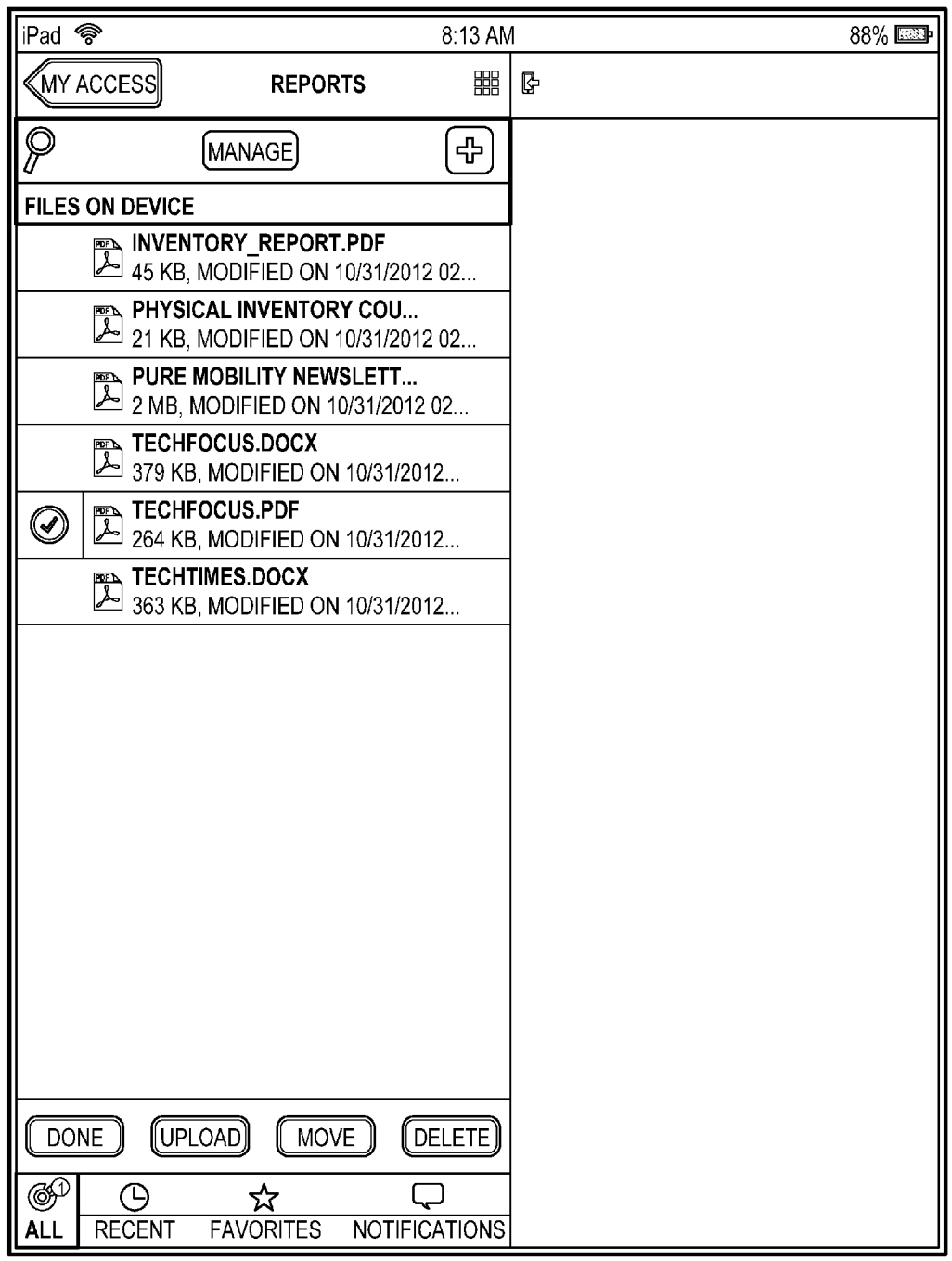
FIG. 16 shows documents within the reports folder of My Access container, under an embodiment.
Figure 17:
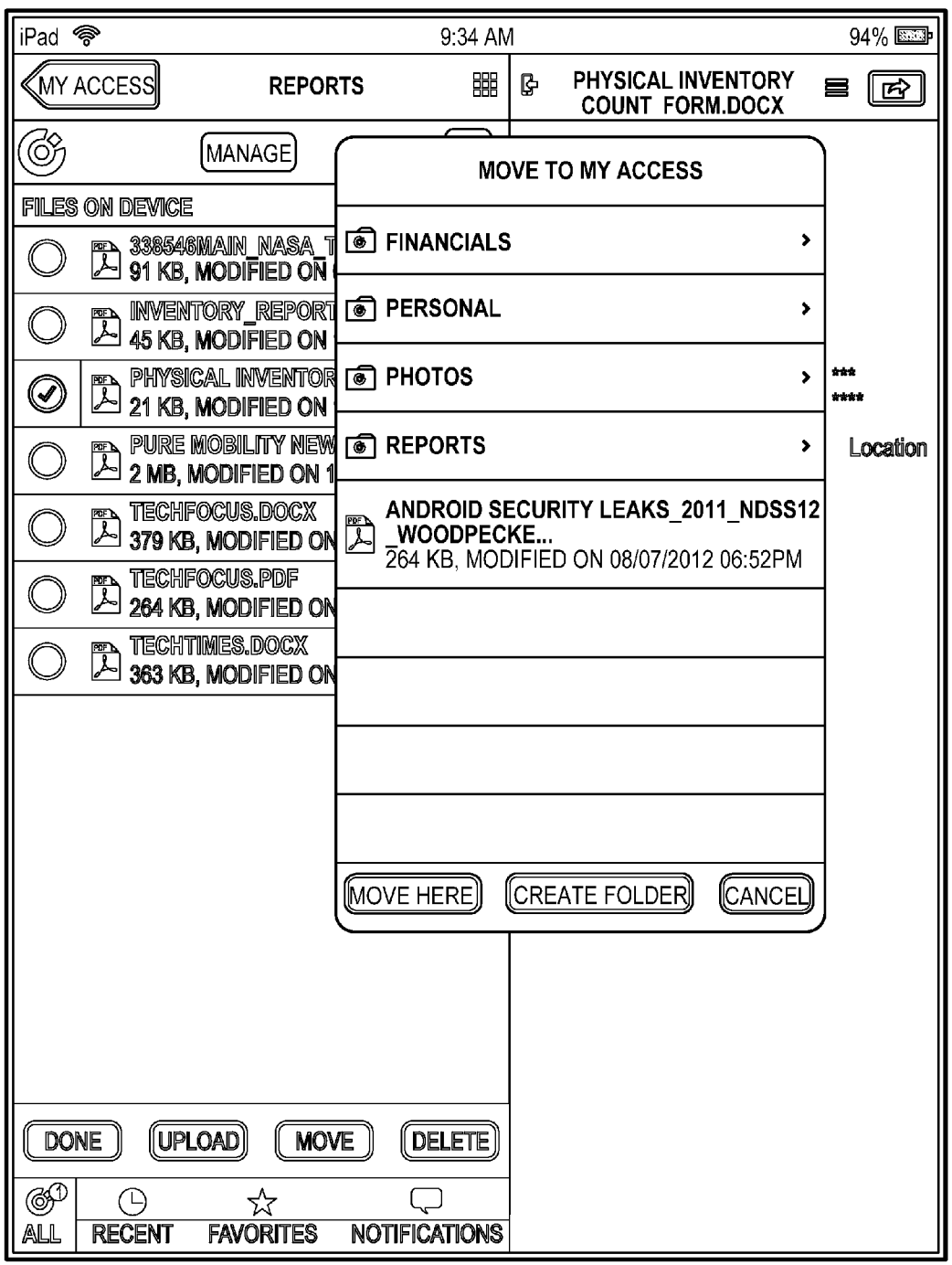
FIG. 17 is an example of activating the "move" command within My Access manage mode, under an embodiment.
Figure 18:
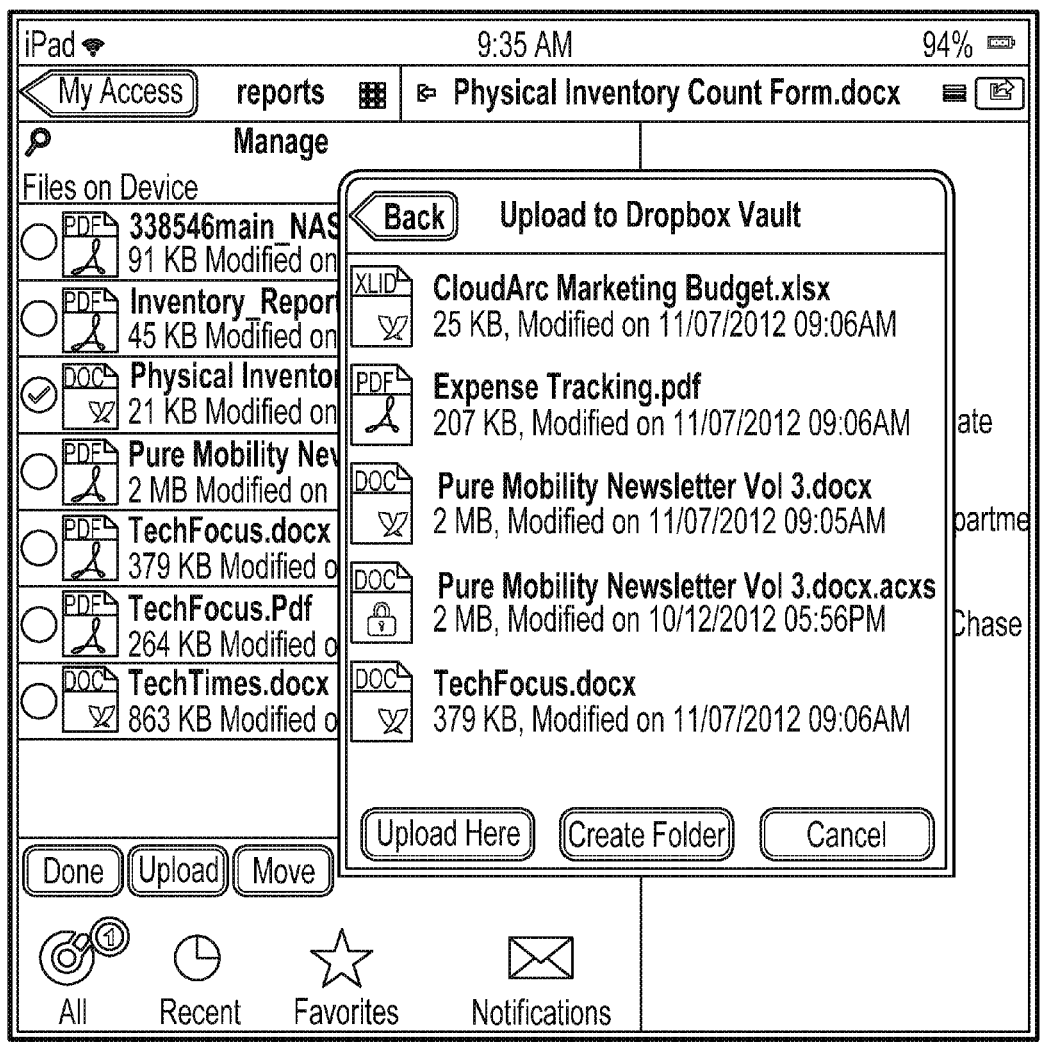
FIG. 18 is an example of activating the "upload" command within My Access manage mode, under an embodiment.
Figure 19:
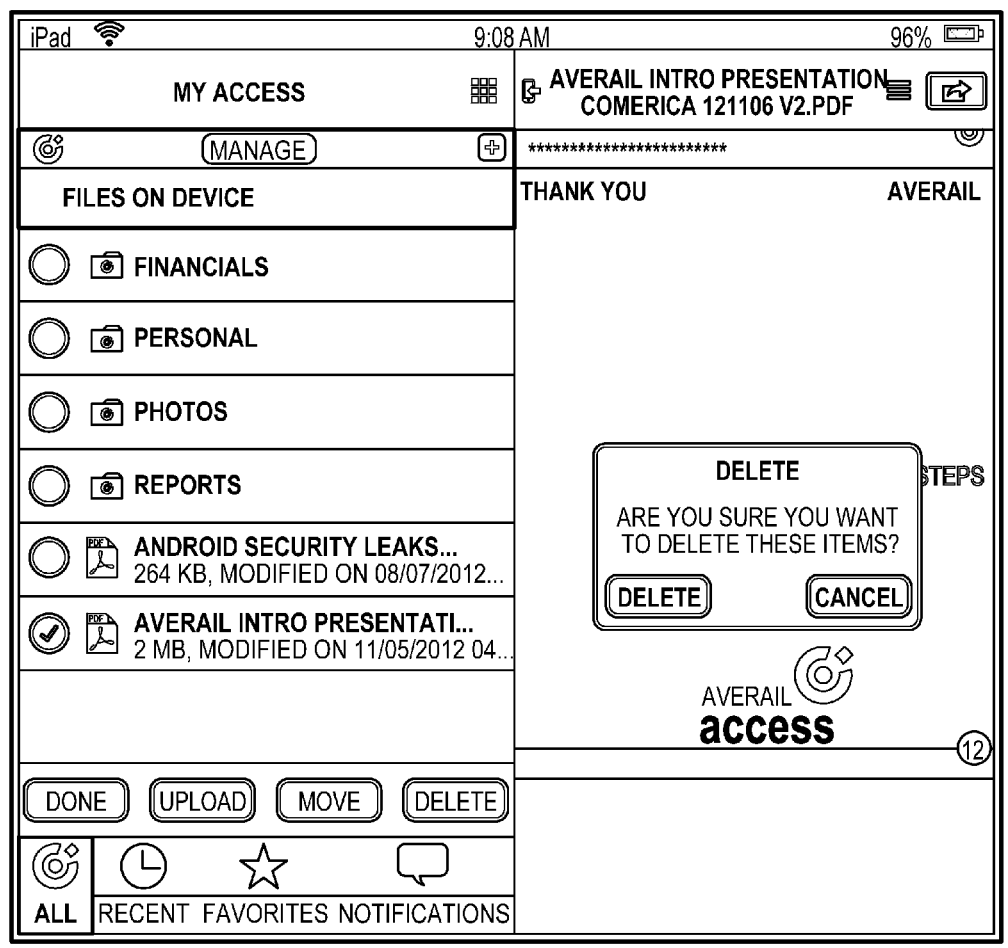
FIG. 19 is an example of activating the "delete" command within My Access manage mode, under an embodiment.

FIG. 16 shows the landing page of a user who has selected "reports" from the My Access folder view (FIG. 10) to enter the "reports" view folder. FIG. 16 shows documents within the reports folder under an embodiment. As seen in FIG. 16, a user has selected the Manage button in the upper portion of the "reports" folder view area. Selecting the manage view area places the application into the Manage mode. This allows the user to select one or more items from the left view panel for actions by checking radio buttons next to each such item. Actions are contextual and displayed below the listed items of the display area. Such actions appear in a row along the lower portion of the reports folder view and include Upload, Move, Delete, and Done. FIG. 17 is an example of activating the "move" command within My Access manage mode. Selecting (or checking) a target file and then the "move" command provides the user a "Move to My Access" dialogue box which permits the user to move the file to a different location within the My Access folder structure. The user may move the file to a target location displayed in the dialogue box or move the file to newly created folder. FIG. 18 is an example of activating the "upload" command within My Access manage mode. Upload permits a user to upload a file from the mobile device to a remote storage location, e.g. a DropBox storage location. Once the user selects the target file, the interface displays an "Upload to Dropbox Vault" panel that enables the user to select the destination for the upload. FIG. 19 is an example of activating the "delete" command within My Access manage mode. Once the user selects the target file and "delete" command, the interface displays a panel that enables the user to delete the selected file. The Done action exits the Manage mode.

Figure 20:
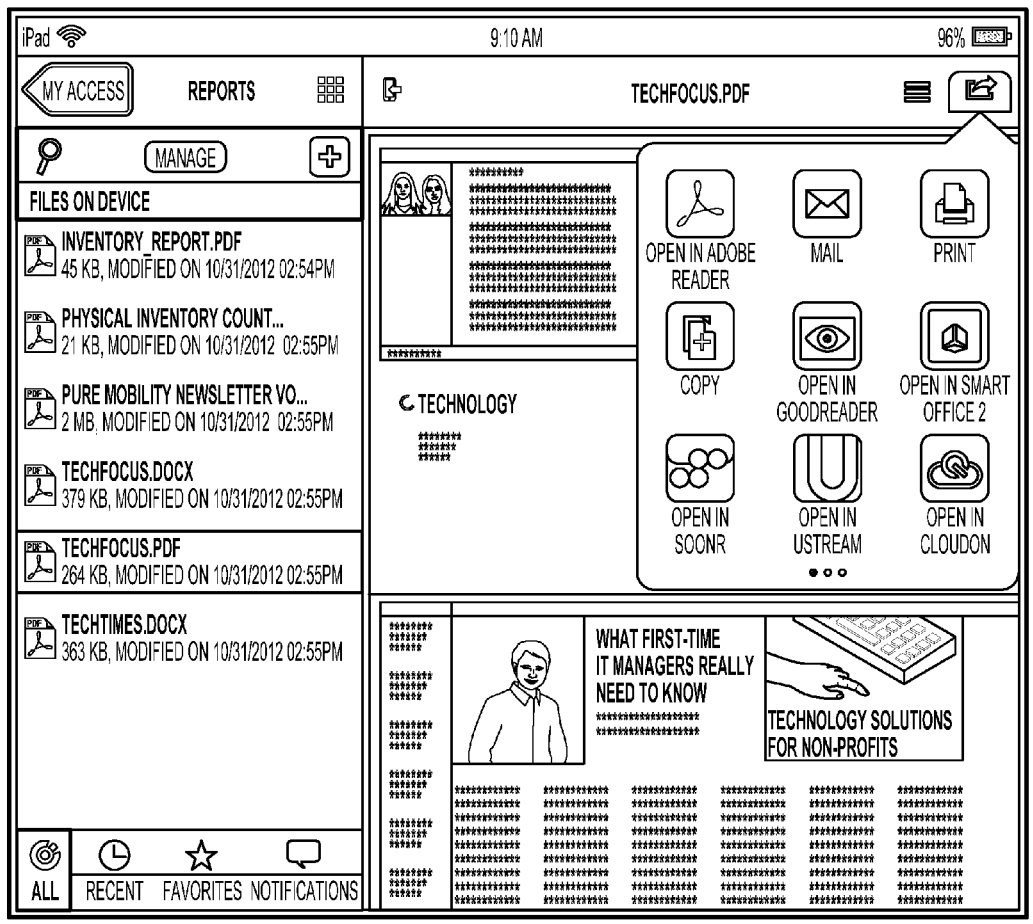
FIG. 20 shows documents within the reports folder of My Access container, under an embodiment.

FIG. 20 shows the landing page of a user who has selected "reports" from the My Access folder view (FIG. 10) to enter the "reports" view folder. FIG. 20 shows documents within the reports folder under an embodiment. The user has selected the "TechFocus.pdf" document which is displayed to the right of the screen in split screen mode. To view file details or metadata, the user may select the Details icon in the upper right of the screen by selecting the tile icon (comprising three parallel horizontally stacked bars). To select an "Open In" action such as print, copy, or "Open In" another app, the user may select the 'Open In' or action menu item in the upper right comprising the box/arrow icon directly to the right of the details icon. FIG. 20 is an example of selecting the "Open In" action within a My Access container. Sharing, editing, copying, and printing features are displayed across the upper right side based upon context. The displayed actions items depend on the type and location of document, e.g. pdf document stored locally in a My Access container under an embodiment, in relation to defined policies for a document with respect to user.

Figure 21:
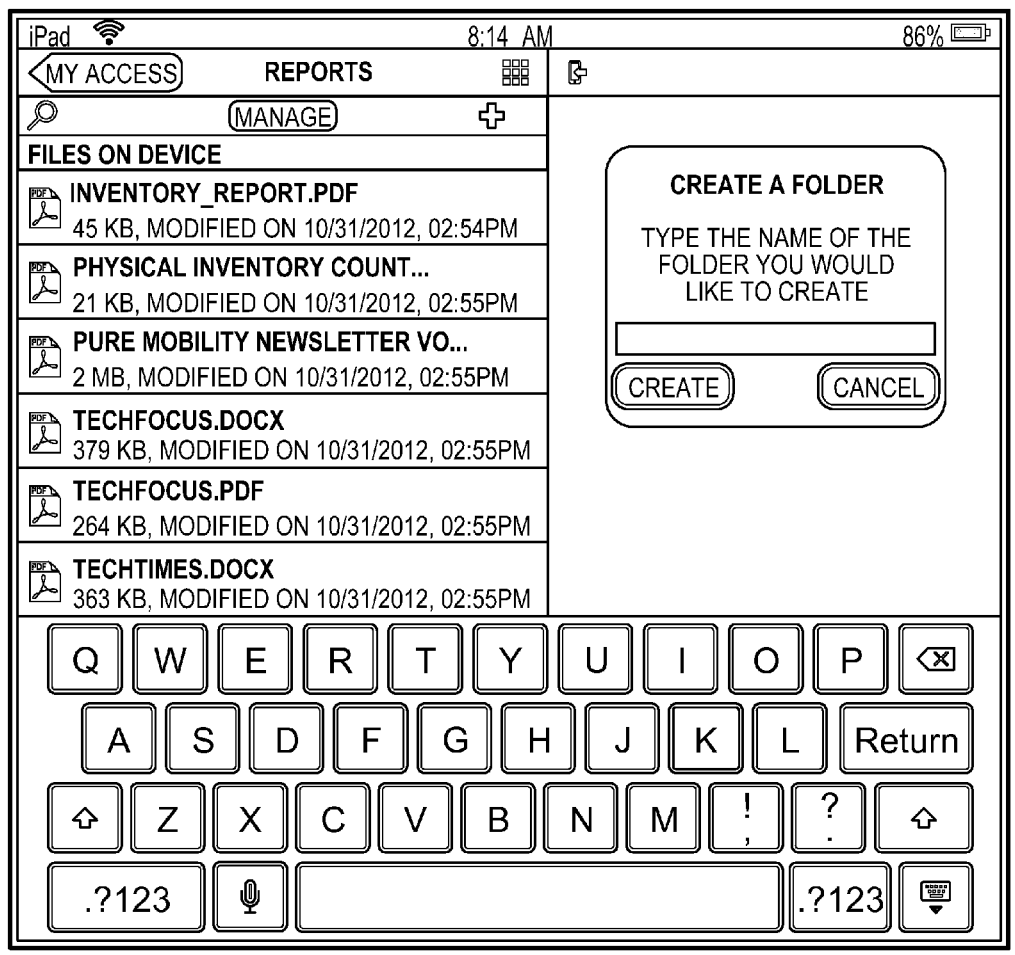
FIG. 21 shows a "Create a Folder" dialogue box that appears when the user selects the add folder button within the "reports" folder of a My Access container, under an embodiment.

From within the My Access folder view, the user may select the add folder button. FIG. 21 shows a "Create a Folder" dialogue box that appears when the user selects the add folder button within the "reports" folder of the My Access container. The user is presented with keyboard enabled entry to enter the name of the folder that the user would like to create. Selecting the create button completes the operation and creates the folder. Alternatively, the user may select the cancel button to cancel the operation.

Figure 22:
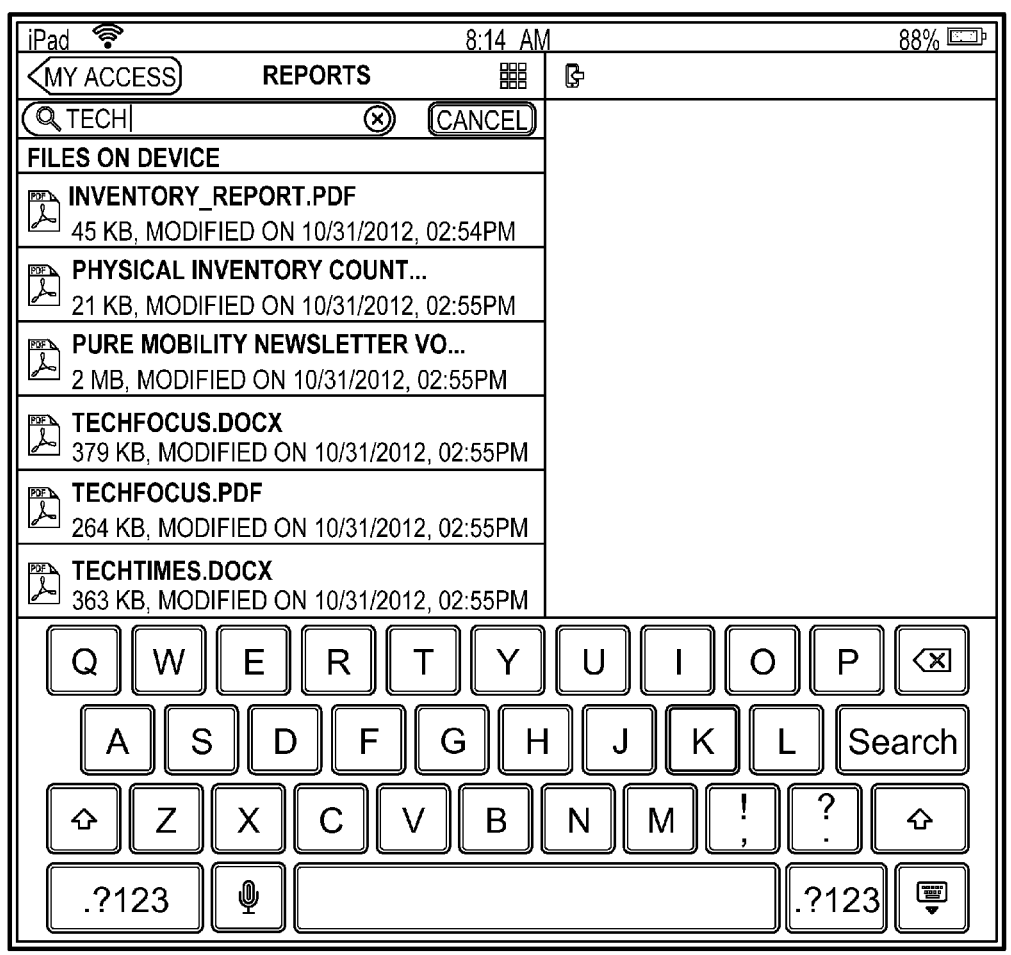
FIG. 22 shows an example of a user searching local files stored locally on a mobile device, under an embodiment.
Figure 23:
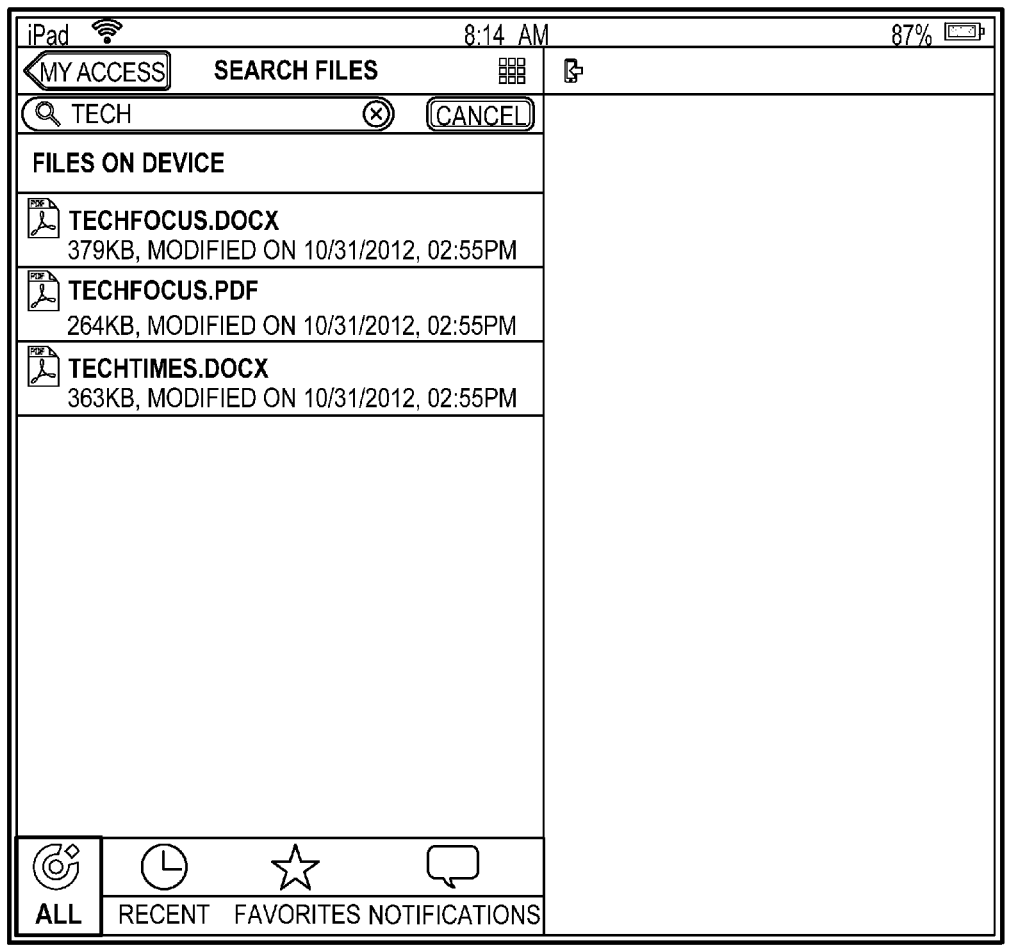
FIG. 23 shows an example of search result containing the word "tech", under an embodiment.

Local search is available from the upper left side of split view displays within any of the content folders represented in the Averail Access dashboard including the My Access, Dropbox and SharePoint containers under an embodiment. FIG. 22 shows an example of a user searching local files stored locally on a mobile device, i.e. within the My Access folder. To search, the user enters a search string into the search box. Results appear below the search box. With reference to FIG. 22, the user initiates the search from within the "reports" folder of the My Access container (see FIG. 10). The user selects the search item/icon and enters the search term "tech" in the search window using the exposed keyboard. The search returns documents on the device containing the word "tech" as shown in FIG. 23. Local search is initiated within a given site, and the scope of the search is limited to the document tree at that level and below. Under an embodiment (not shown in FIG. 23), users have an option to continue extended search on the server in the event that located files are not cached on the mobile device.

The Averail dashboard of FIG. 7 includes a SharePoint container or folder. A SharePoint folder is a folder for the user to manage, view, browse and open files on the mobile device that are stored in an on-premise SharePoint site. SharePoint folders may correspond to SharePoint site collections, sites, subsites, libraries, lists, web parts or folders. The user opens the folder by tapping the folder from the Dashboard. Users or System Administrators may configure multiple SharePoint sites for display on the Dashboard. When opened, the SharePoint folder view displays a list of files, folders, sites or other SharePoint elements along the left side of the screen. The SharePoint folder view occupies a left justified column portion of the screen with a width approximately one third the width of the overall screen view. An upper portion of the folder view includes a search item/button, a manage button, and an add file item/button across the top of the folder/document list. A lower portion of the folder view screen includes tab view controllers including "All", "Recent", "Favorites" and "Notifications". The "Recent", "Favorites" and "Notifications" tabs maintain the same functionality as those described with respect to the My Access folder view.

Figure 24:
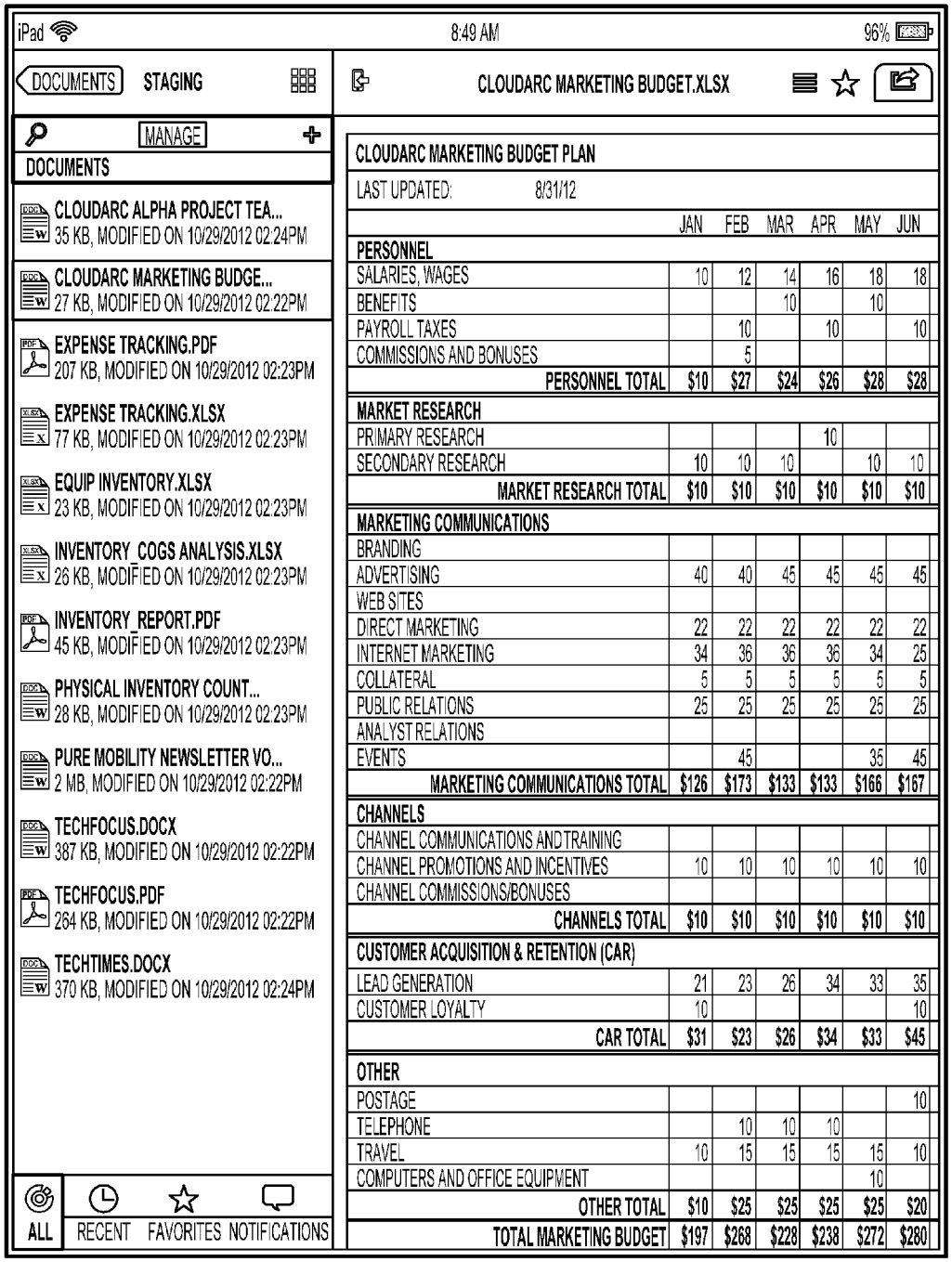
FIG. 24 shows documents within a SharePoint container, under an embodiment.
Figure 25:
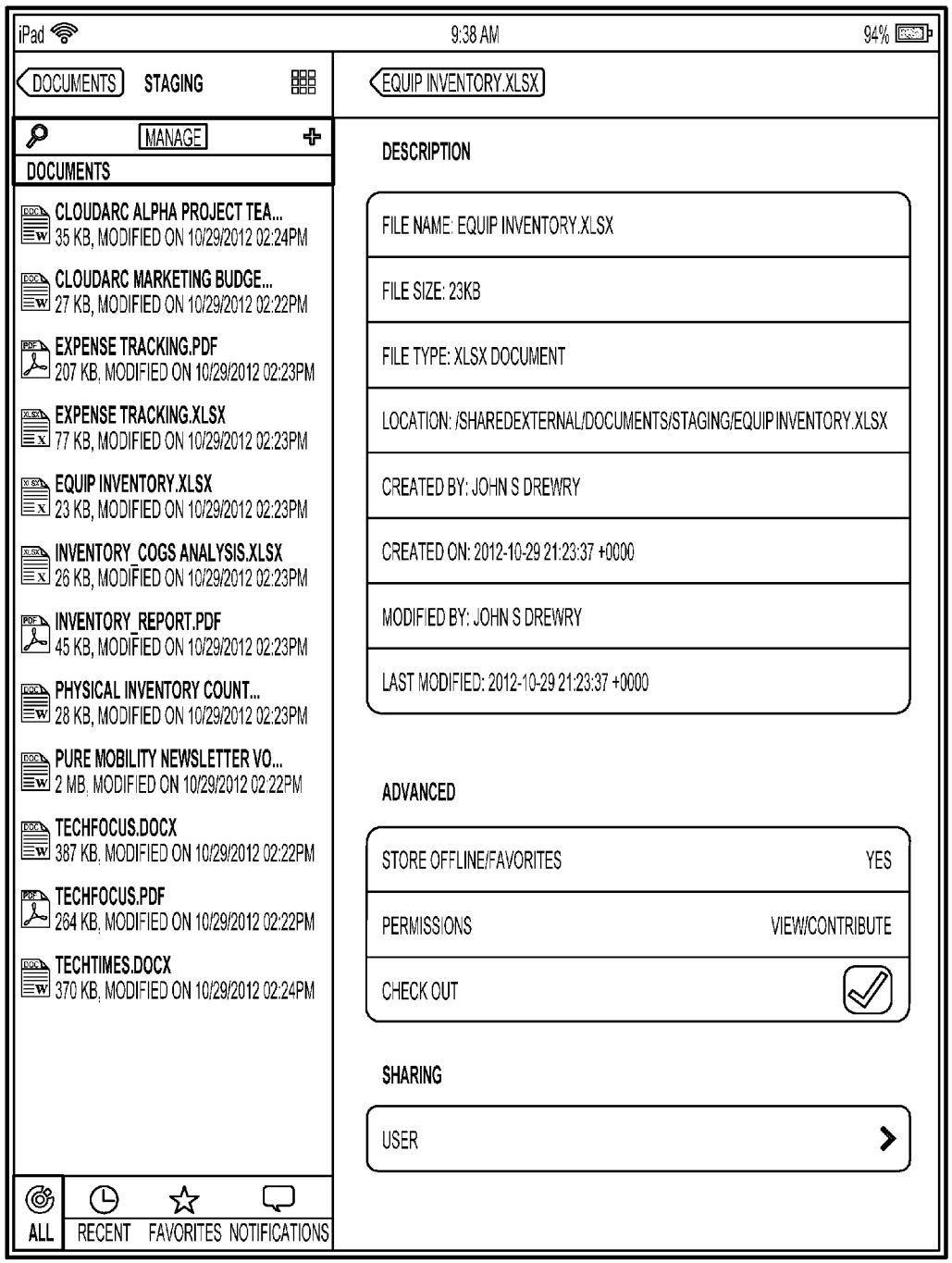
FIG. 25 is an example display of file metadata, under an embodiment.
Figure 26:
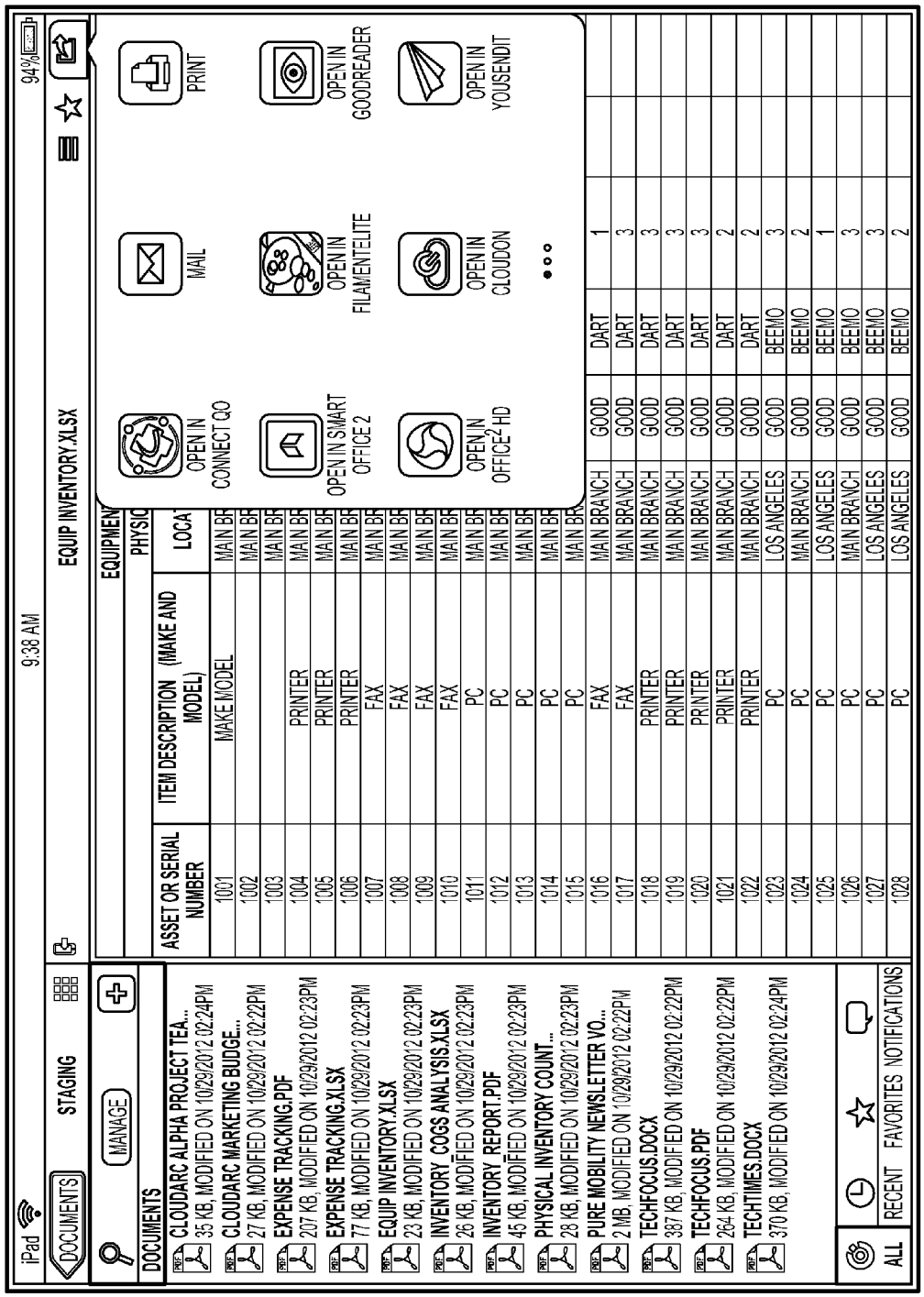
FIG. 26 is an example of selecting the "Open In" action within a SharePoint container, under an embodiment.

FIG. 24 shows documents within a SharePoint container under an embodiment. The user has selected the "Cloud Arc . . . xlsx" document which is displayed to the right of the screen in split screen mode. Selecting a file displayed in the folder view displays that item on the right panel. The user may view the file in full screen mode by selecting the Expand icon to fold back the navigation panel on the left. To mark/unmark a file for offline viewing, the user may select the Star icon on the upper right of the screen. To view file details or metadata regarding selected file, the user may select the Details icon in the upper right of the screen by selecting the tile icon (comprising three parallel horizontally stacked bars). FIG. 25 is an example of file metadata under an embodiment showing location of file "Equip Inventory.xlsx" at SharePoint file location "/sharedexternal/Documents/Staging/" and including other metadata. To select an "Open In" action such as print, copy, or "Open In" another app, the user may select the 'Open In' or action menu item in the upper right comprising box/arrow icon directly to the right of the details icon. FIG. 26 is an example of selecting the "Open In" action within a SharePoint container. Sharing, editing, copying, and printing features are displayed across the upper right side based upon context. The displayed action items depend on the type and location of document, e.g. xlsx document stored in a SharePoint container under an embodiment, in relation to defined policies and permissions for the document with respect to user.

Figure 27:
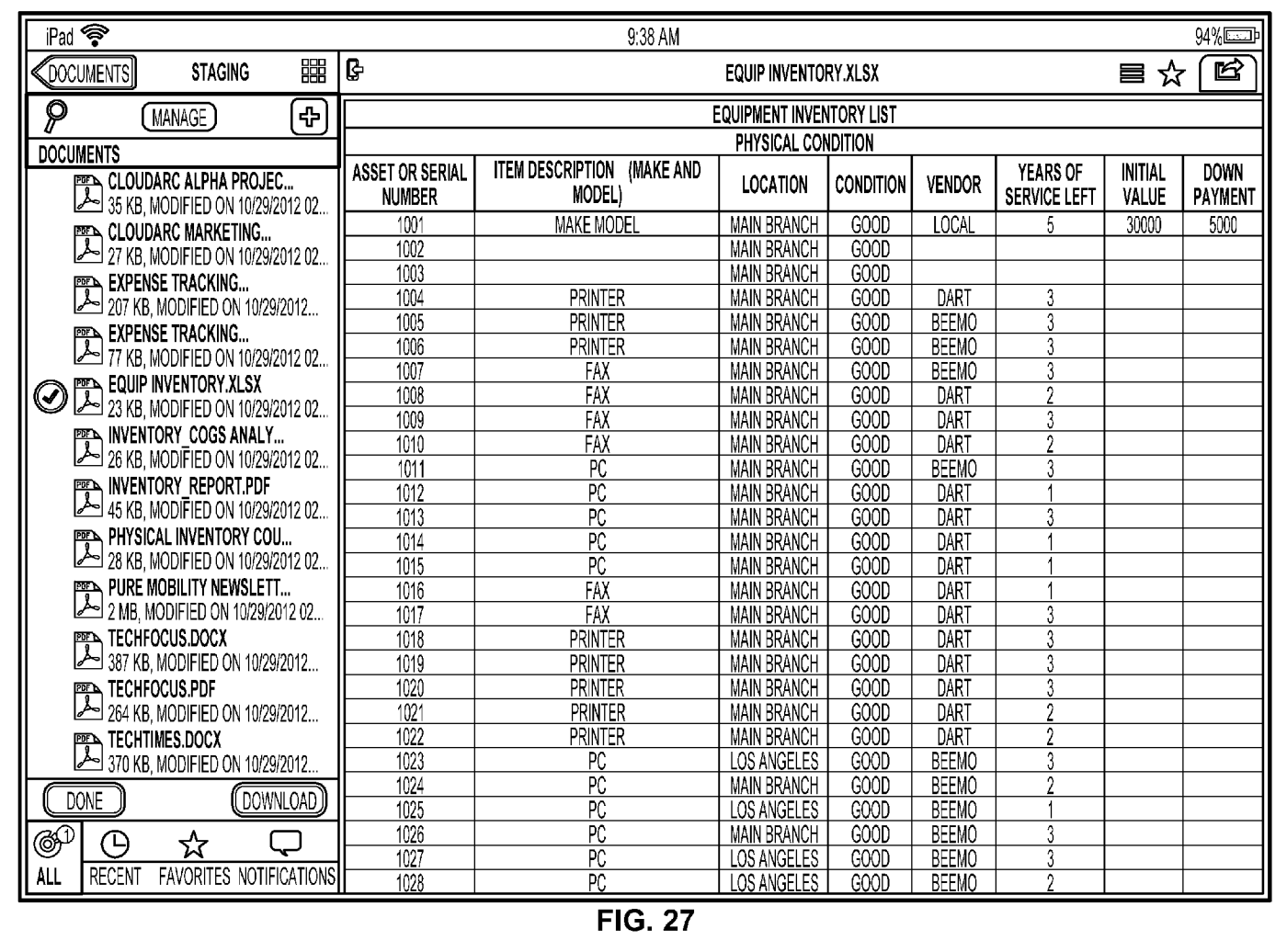
Figure 28:
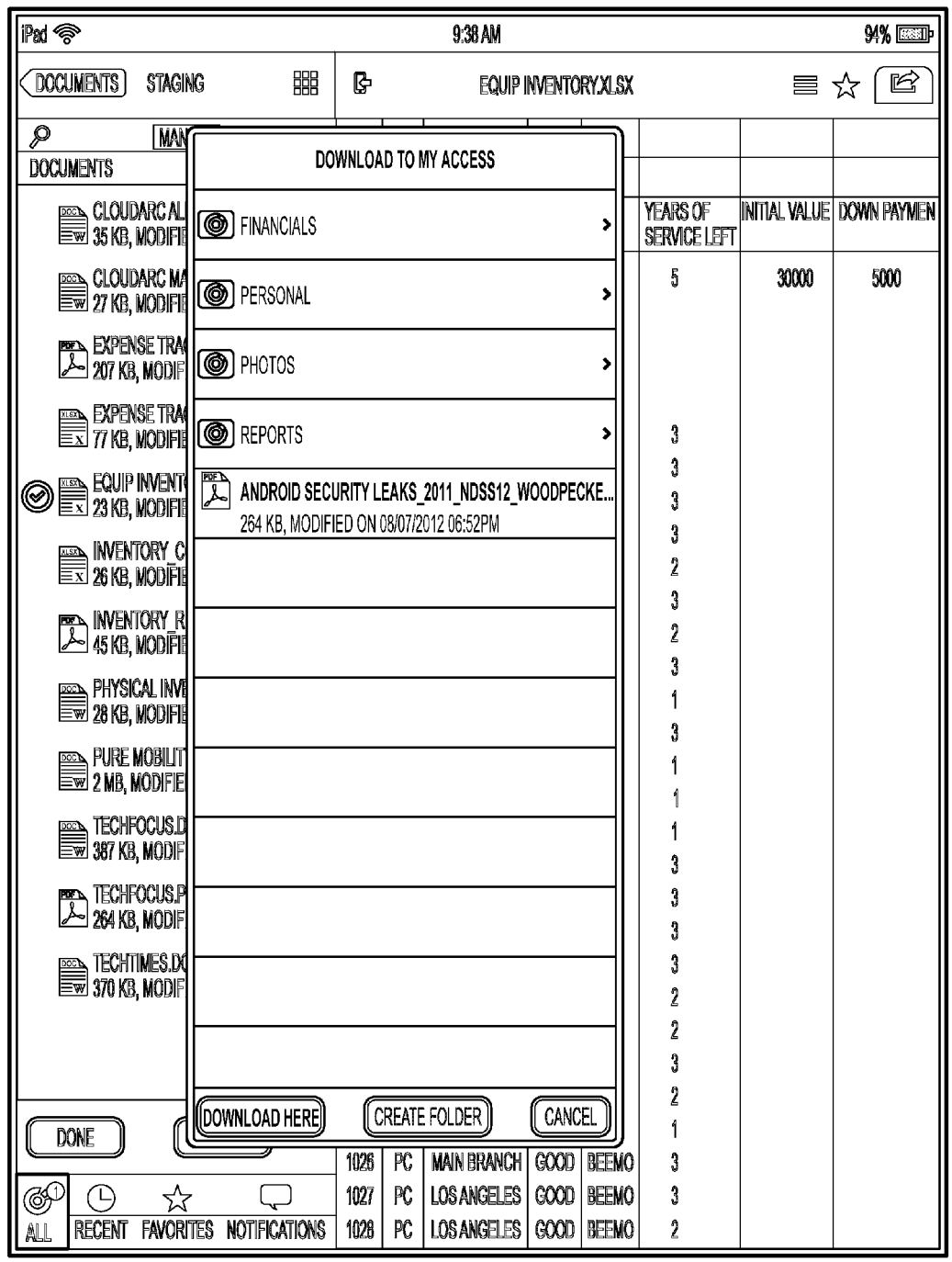
FIG. 28 is an example of activating the "download" command within the SharePoint manage mode, under an embodiment.

As seen in FIG. 27, a user has selected the Manage button in the upper portion of the SharePoint folder view area. Selecting the manage view area places the application into the Manage mode. This allows the user to select one or more items from the left view panel for actions by checking radio buttons next to each such item. Actions are contextual and displayed below the listed items of the display area. Such actions appear in a row along the lower portion of the SharePoint folder view and include Done and Download. FIG. 28 is an example of activating the "download" command within the SharePoint manage mode. Selecting (or checking) a target file and then the "download" command provides the user a "Download to My Access" dialogue box which permits the user to download the file to a location within the My Access folder structure. The user may download the file to the target location displayed in the dialogue box or move the file to a newly created folder.

Figure 29:
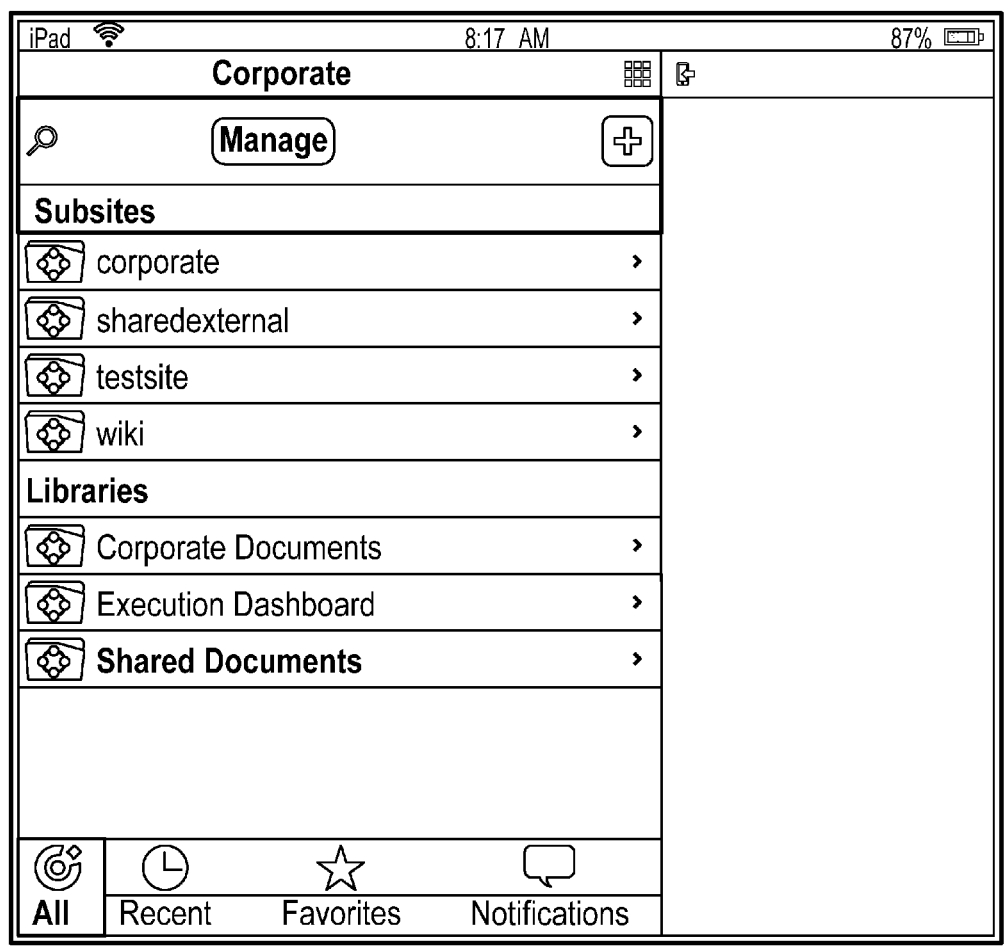
FIG. 29 is an example of a SharePoint folder view, under an embodiment.
Figure 30:
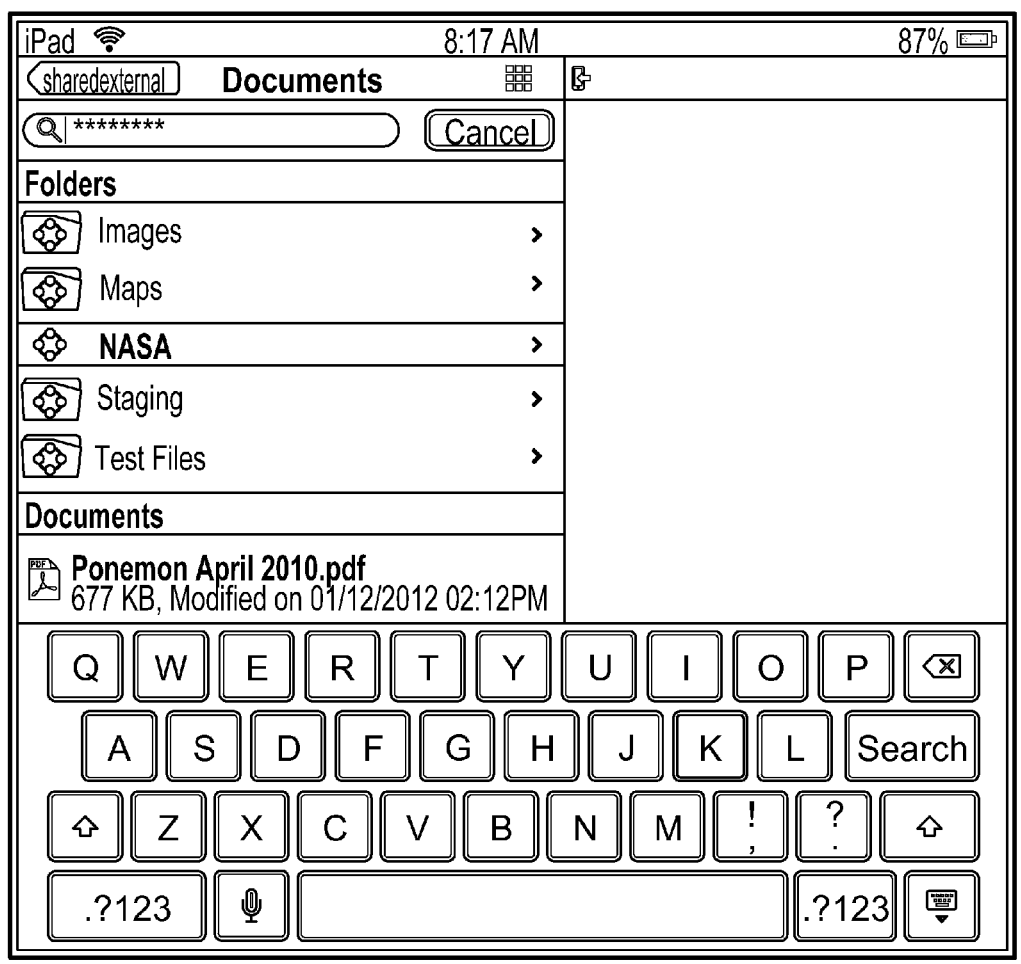
FIG. 30 provides an example of a local search initiated within a SharePoint folder view, under an embodiment.
Figure 31:
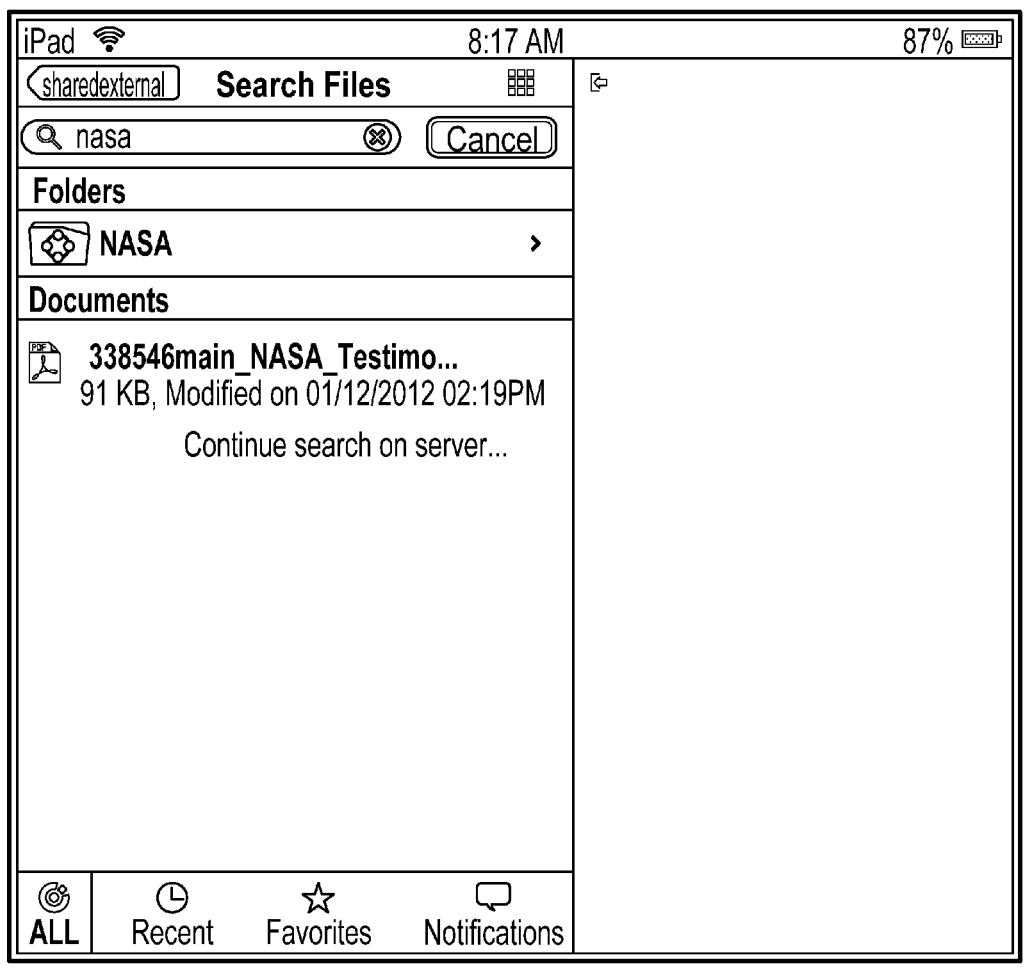
FIG. 31 shows an example local search, under an embodiment.

FIG. 29 is an example of a SharePoint folder view which displays SharePoint subsites and libraries under an embodiment. FIG. 30 provides an example of a local search initiated within a SharePoint contents folder under an embodiment. Note that the user has selected the "sharedexternal" subsite of FIG. 29. From within the "sharedexternal" subsite, the user selects the search icon and enters a search string into the search box. FIG. 31 shows that the user has entered the search term "nasa". Results appear below the search box. User has an option to continue extended search on the server when identified files are not cached on the mobile device.

The Averail dashboard of FIG. 7 includes a Dropbox folder. A Dropbox folder is a folder for the user to manage, view, browse and open files on the mobile device that are stored in a Dropbox account. The user opens the folder by tapping it from the Dashboard. When opened, the Dropbox folder view displays a list of files and folders along the left side. The Dropbox folder view occupies a left justified column portion of the screen with a width approximately one third the width of the overall screen view. An upper portion of the folder view includes a search item/button, a manage button, and an add file item/button across the top of the folder/document list. A lower portion of the folder view screen includes tab view controllers including "All", "Recent", "Favorites" and "Notifications". The "Recent", "Favorites" and "Notifications" tabs maintain the same functionality as those described with respect to the My Access folder view. FIG. 32 shows documents within a DropBox container under an embodiment. The user has selected the "CloudArc . . . xlsx" document which is displayed to the right of the screen in split screen mode. Selecting a file displayed in the folder view displays that item on the right panel. The user may view the file in full screen mode by selecting the Expand icon to fold back the navigation panel on the left. To view file details or metadata, the user may select the Details icon in the upper right of the screen by selecting the tile icon (comprising three parallel horizontally stacked bars). To mark/unmark a file for offline viewing, the user may select the Star icon on the upper right. To select an "Open In" action such as print, copy, or "Open In" another app, the user may select the 'Open In' or action menu item in the upper right comprising box/arrow icon directly to the right of the details icon. Sharing, editing, copying, and printing features are displayed across the upper right side based upon context. The displayed action items depend on the type and location of document, e.g. pdf document stored in a DropBox location, in relation to defined policies and permissions for document and/or user identity under an embodiment.

Figure 33:
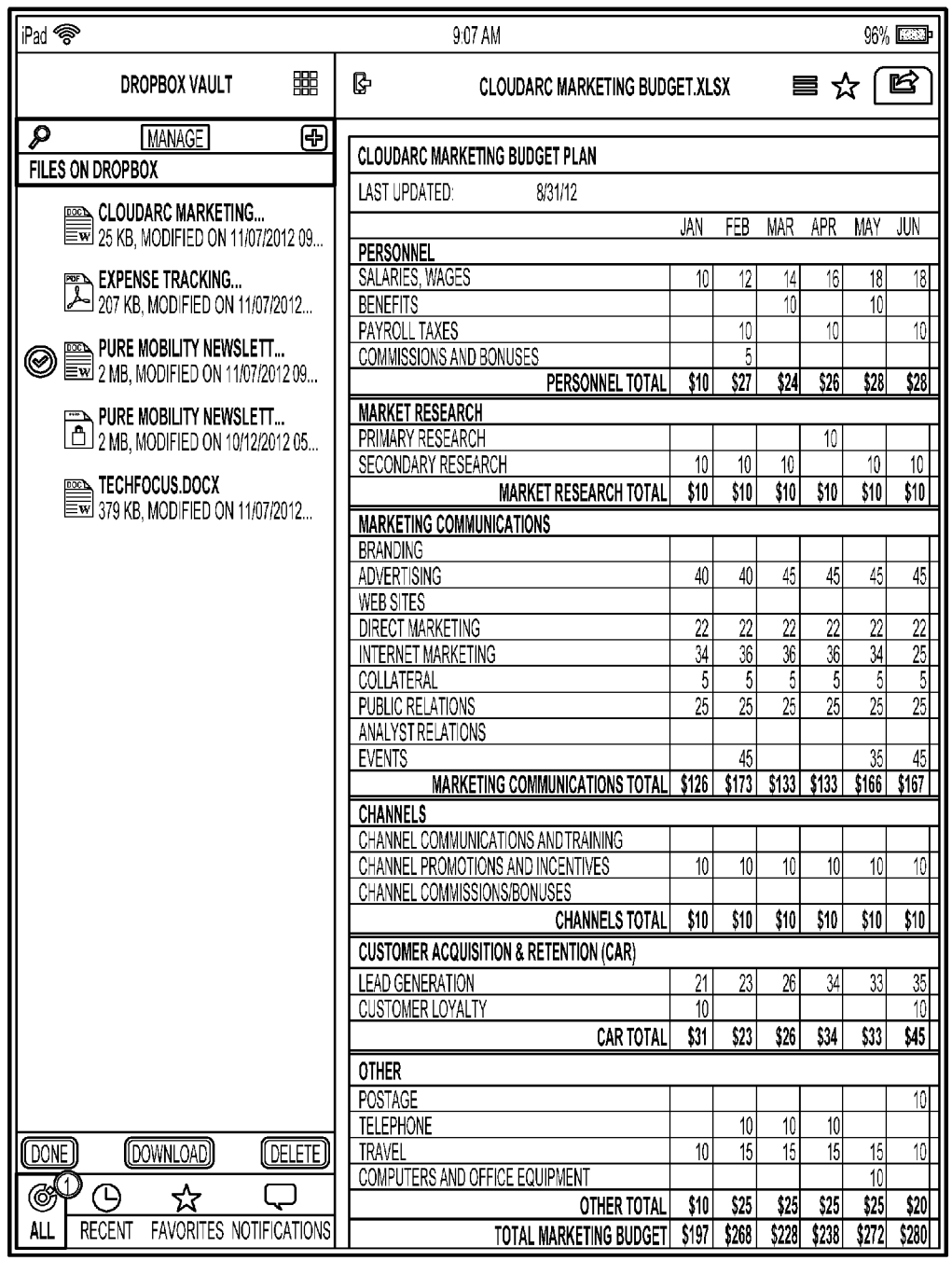
FIG. 33 shows manage mode in the DropBox folder view area, under an embodiment.
Figure 34:
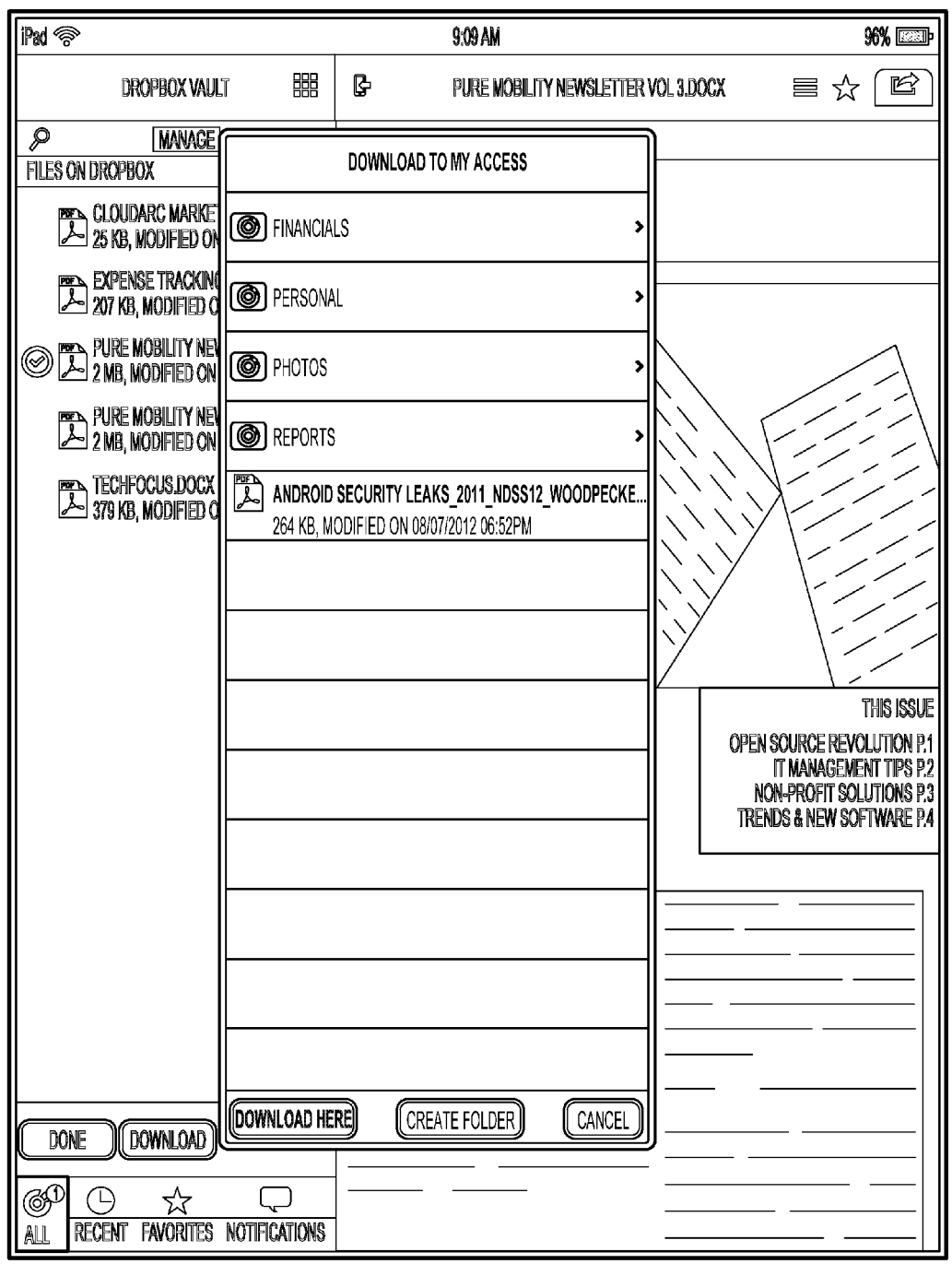
FIG. 34 is an example of activating the "download" command within the DropBox manage mode, under an embodiment.

As seen in FIG. 33, a user has selected the Manage button in the upper portion of the DropBox folder view area. Selecting manage button places the application into the Manage mode. This allows the user to select one or more items from the left view panel for actions by checking radio buttons next to each such item. Actions are contextual and displayed below the listed items of the display area. Such actions appear in a row along the lower portion of the DropBox folder view and include Done, Download and Delete. FIG. 34 is an example of activating the "download" command within the DropBox manage mode. Selecting (or checking) a target file and then the "download" command provides the user a "Download to My Access" dialogue box which permits the user to download the file to a location within the My Access folder structure. The user may download the file to the target location displayed in the dialogue box or move the file to a newly created folder.

As described above, Averail Access uses a dashboard or workspace concept that organizes content into folders that are readily accessible to users running the Averail application on an iPad. Each folder may correspond to a different content domain, for example a Dropbox account or a distinct corporate SharePoint site (or subsite, library or folder) under an embodiment. As described above, FIG. 7 is an Averail workspace/dashboard under an embodiment. To assist in navigation and feature actions, the dashboard features the menu items along the right side of the display. The menu items include search documents, recent documents, favorites, add site, notifications, and settings.

Figure 35:
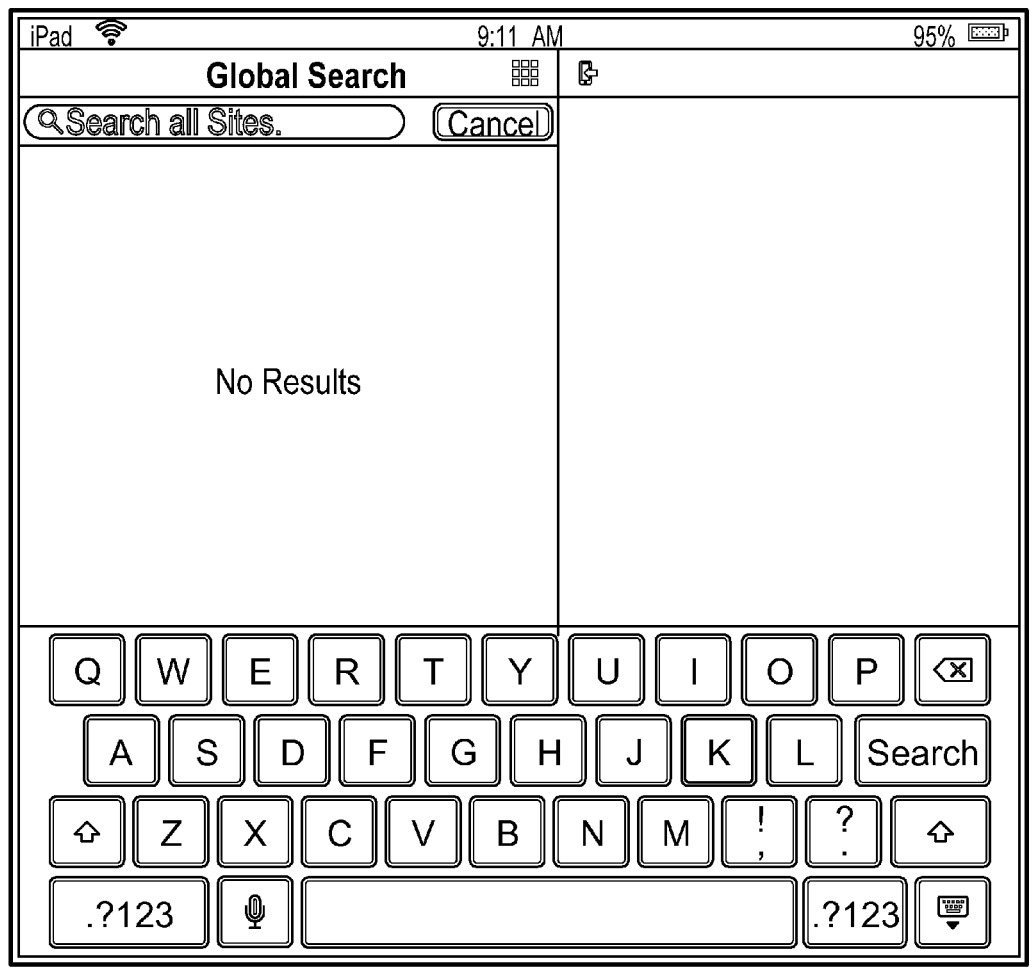
FIG. 35 is an example of a global search, under an embodiment.

A user may select the search button to initiate a global search. Under an embodiment, global search permits a user to search for files across content sites by inputting a string into a search box. Search results are displayed below the search box. FIG. 35 is an example of a global search under an embodiment. Users have an option to continue extended search on the server in the event that files are not cached on the mobile device. Global search is similar to local search but search strings with results that match multiple items across sites will be grouped according to site under an embodiment (not shown).

A user may view recent files by selecting the recent documents button on the main dashboard. The recent files view is also available for quick viewing via the tab view controller button located along the lower left side of the split view screens within a given document folder view (as presented within My Access folder, Sharepoint folder and Dropbox folder under an embodiment). The Recent files view presents the same display when accessed from either dashboard menu button or a document folder view controller (see FIG. 11). The recent files view displays a reverse chronological list of list of recently viewed files. A user may select an item in the list to view or open that file.

A user may access the Favorites view via the menu button on the Dashboard. The Favorites view is also available for quick viewing via the tab view controller button located along the lower left side of the split view screens within a given document folder view (as presented within My Access folder, Sharepoint folder and Dropbox folder under an embodiment). The Favorites file view presents the same display when accessed from either dashboard menu button or a document folder view controller (see FIG. 12). The Favorites view displays a sorted list of files that have been explicitly marked as Favorites within the Averail Access service interface. Favorites items are also available for offline viewing.

Figure 36:
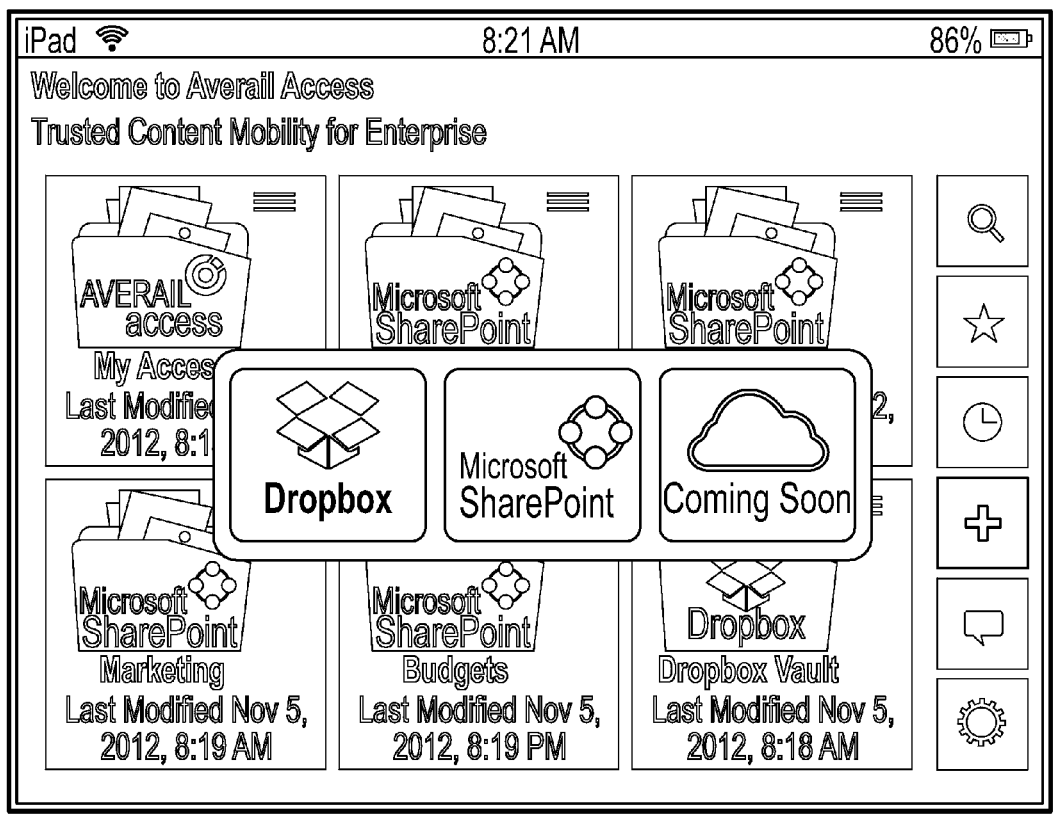
FIG. 36 is an example of a selector bar, under an embodiment.
Figure 37:
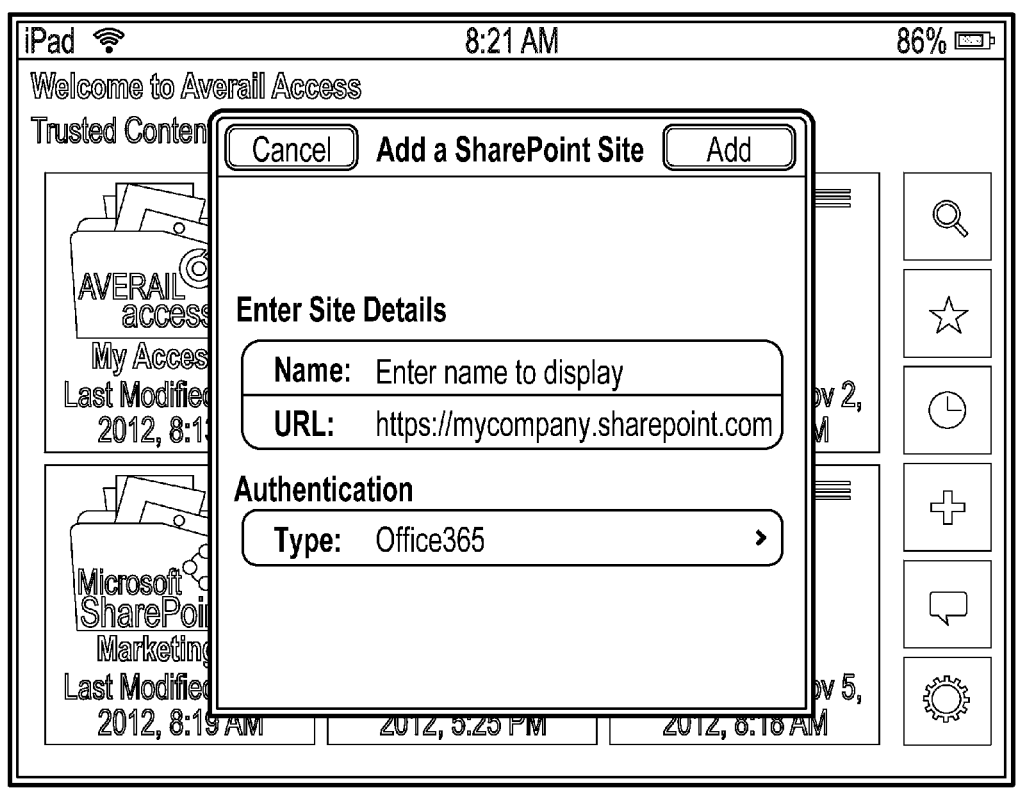
FIG. 37 is an example of a site configuration panel, under an embodiment.

A user may add a site using the Add Site menu button located on the Dashboard. It permits a user to add a new storage site. When selected, the Add Site button opens a selector bar overlay from which the user selects the type of site a user wishes to add. FIG. 36 is an example of a selector bar under an embodiment. Once a user selects a site type, the application interface navigates to a site configuration panel for the respective site. FIG. 37 is an example of a site configuration panel under an embodiment.

The Notifications view is available via the menu Notifications menu button on the Dashboard. The Notifications view is also available for quick viewing via the tab view controller button located along the lower left side of the split view screen within a given document folder view (as presented within My Access folder, Sharepoint folder and Dropbox folder under an embodiment). The Notifications view presents the same display when accessed from either dashboard menu button or document folder view controller (see FIG. 13). Under an embodiment, the Notifications view displays a sorted list of events or messages for the user. These can be system messages such as "system downtime" or item-related messages such as "User X has shared File Y with you". Notification items can be selected to display detailed information such as time, date, filename, etc.

Figure 38:
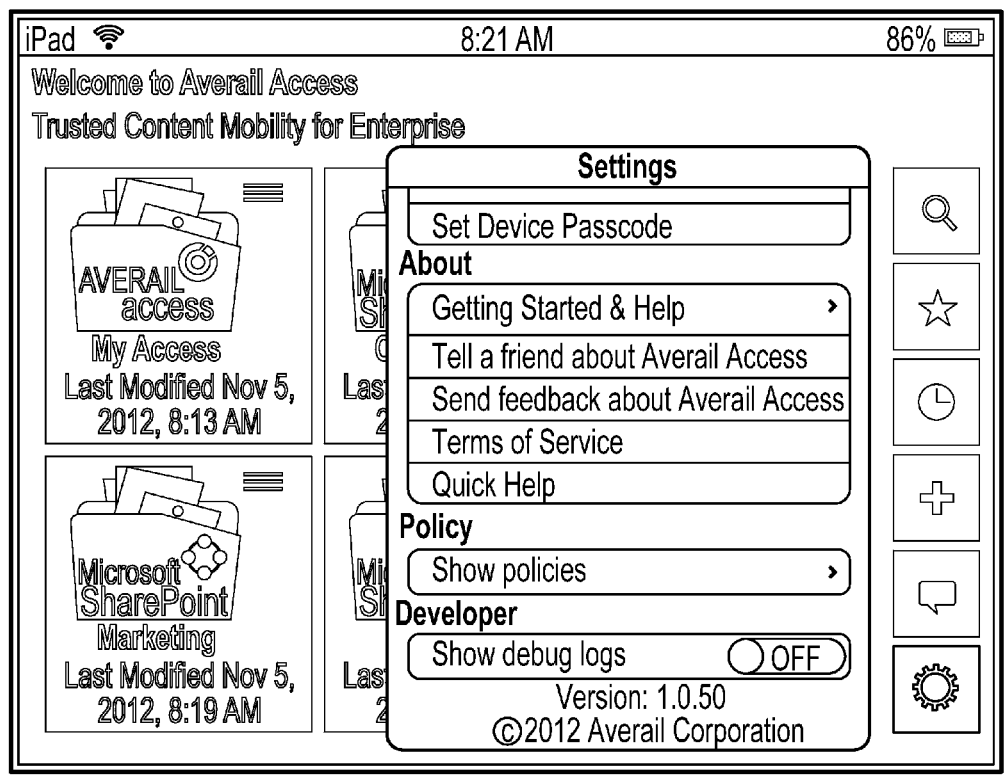
FIG. 38 shows a settings panel display, under an embodiment.
Figure 39:
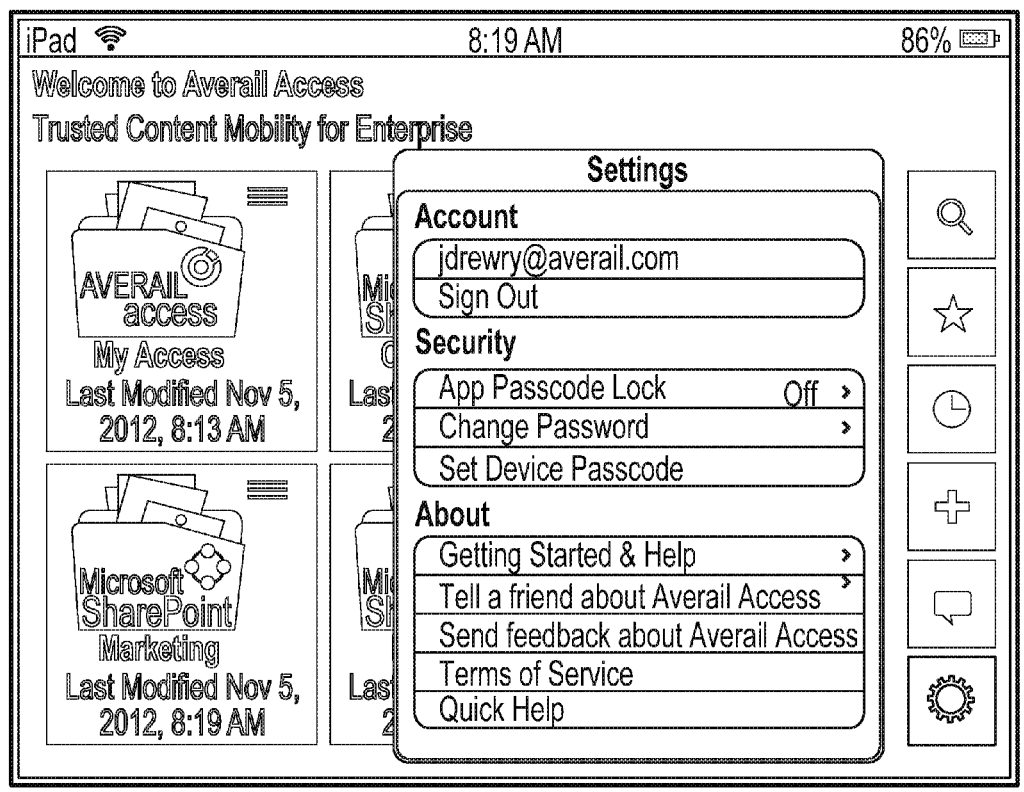
FIG. 39 shows a settings panel display, under an embodiment.

The Settings panel is available via the Setting menu button on the Dashboard. When open, the Settings panel displays configuration information and permits the user to take various actions. FIGS. 38 and 39 show in combination a settings panel display under an embodiment. The panel display includes Account, Security, About, Policy and Developer sections.

Figure 40:
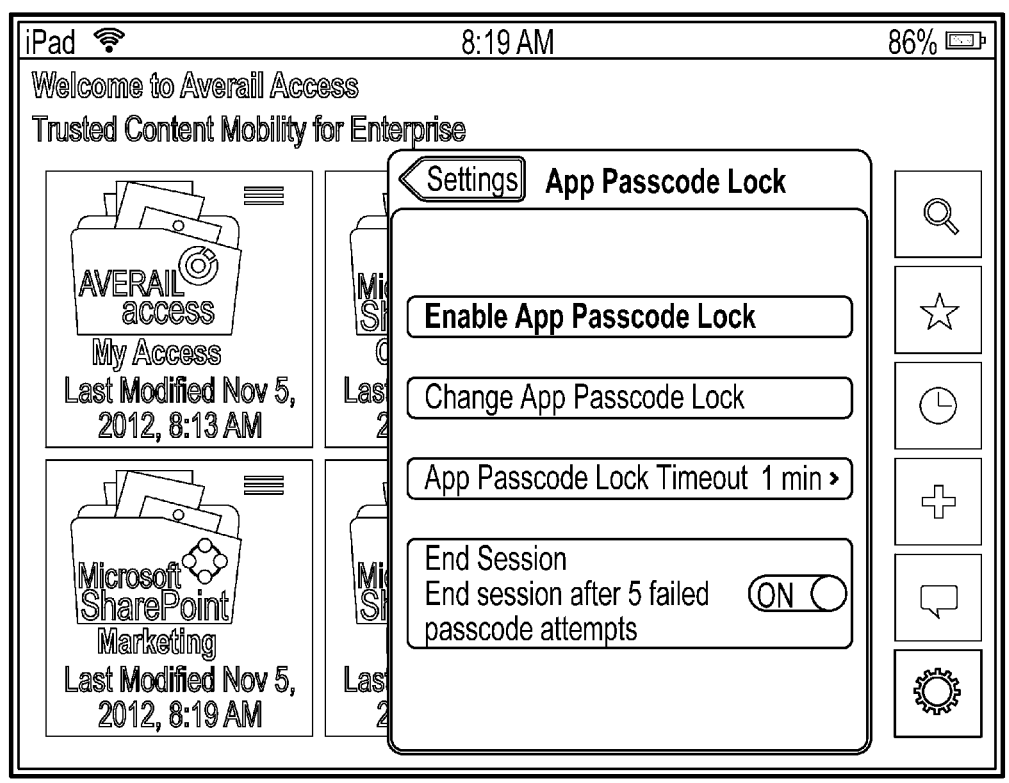
FIG. 40 shows an App Passcode Lock interface, under an embodiment.
Figure 41:
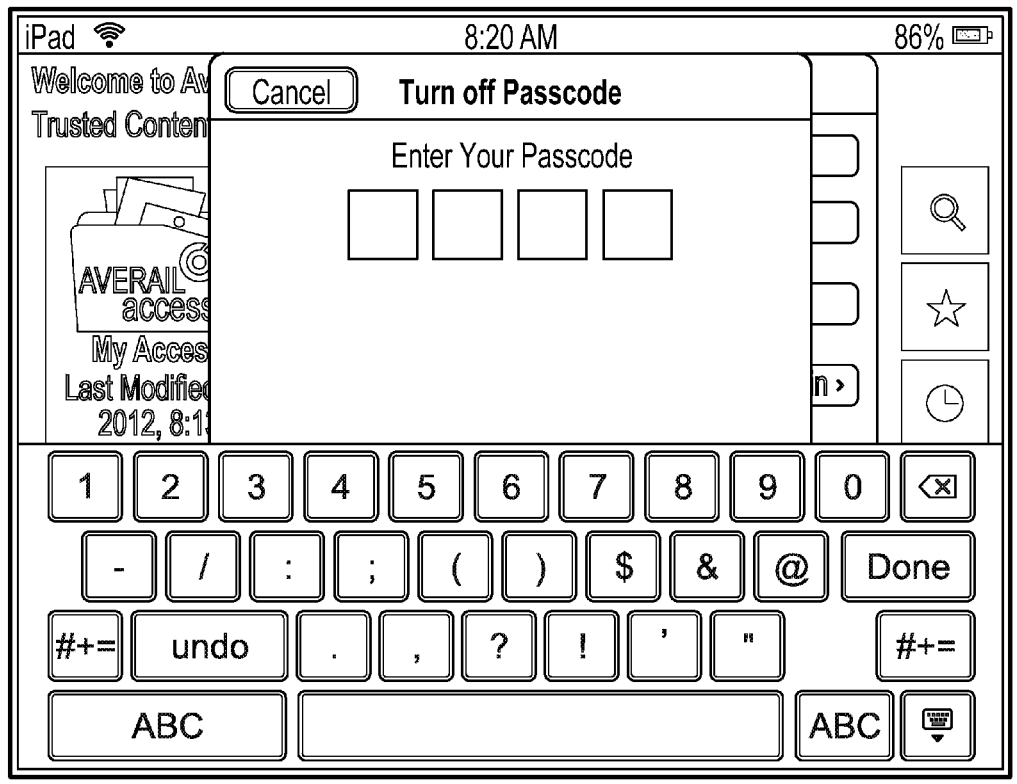
FIG. 41 shows a disable passcode interface, under an embodiment.
Figure 42:
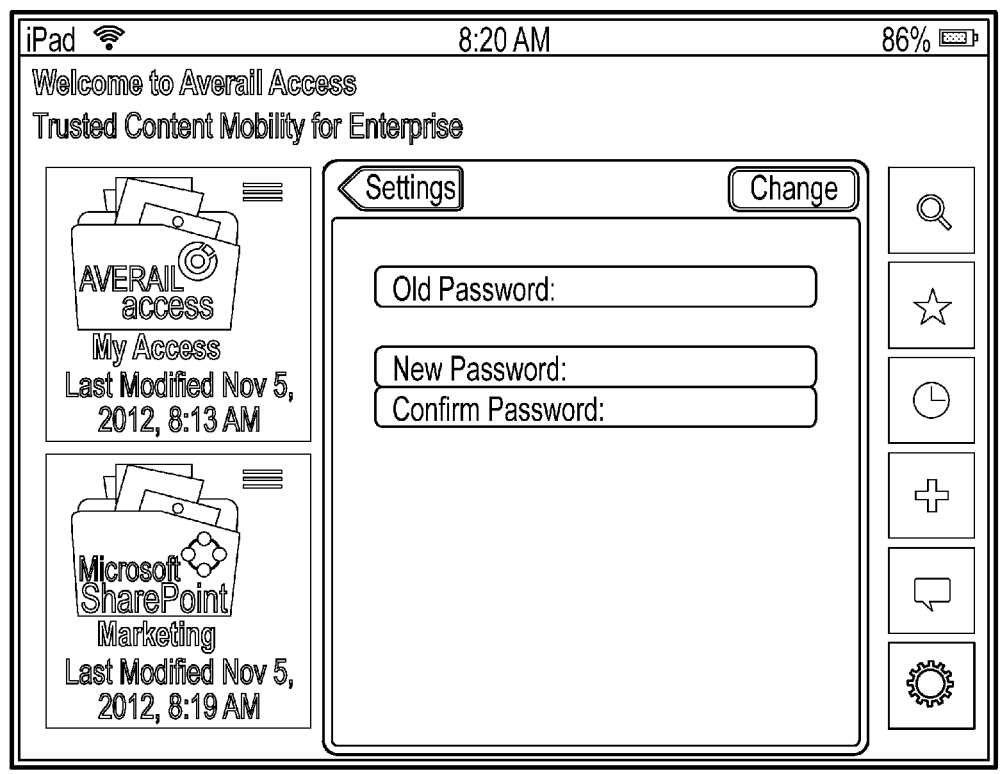
FIG. 42 shows a change password interface, under an embodiment.

FIG. 39 shows Account and Security sections under an embodiment. The Account section provides the user an option to sign out of the Averail application. The Account section also displays the current user by email address. The Security section shows App Passcode Lock, Change Password and Set Device Passcode options. The App Passcode Lock option enables a user to configure an Averail application passcode that must be entered before opening the application. The user selects the App Passcode Lock option to navigate to the corresponding App Passcode Lock interface (as seen in FIG. 40 under an embodiment). Additional parameters for the application passcode may be configured by a user or an administrator using such interface including enabling/disabling passcode lock, changing passcode, setting passcode lock timeouts, and end session parameters. Under an embodiment, the user selects the enable option of the App Passcode Lock interface to enable passcode functionality. Conversely, a user may select the same option providing under an embodiment a "disable" (versus "enable") prompt to turn off passcode functionality thereby navigating user to the interface displayed in FIG. 41. As seen in such interface, the user is asked to provide a passcode in order to turn off passcode functionality. The Change Password option of the Security section permits the user to change a password associated with the user's user id using the interface of FIG. 42 under an embodiment. The Set Device Passcode option of the Security section permits a user to set the passsscode that must be entered before opening the Averail application.

The About section of the Settings panel (FIGS. 38 and 39) includes Getting Started & Help, Tell a friend, Send feedback, terms of service and quick help options. The Getting Started & Help option navigates users to support related information. The Tell a friend option permits a user to address and send a message to one or more friends to tell them about the Averail Access application. The Send feedback option permits a user to address and send feedback in a message to Averail support. Terms of service provides user the terms of service under which Averail application is available for use and the quick help option provides easily accessible support material.

Figure 43:
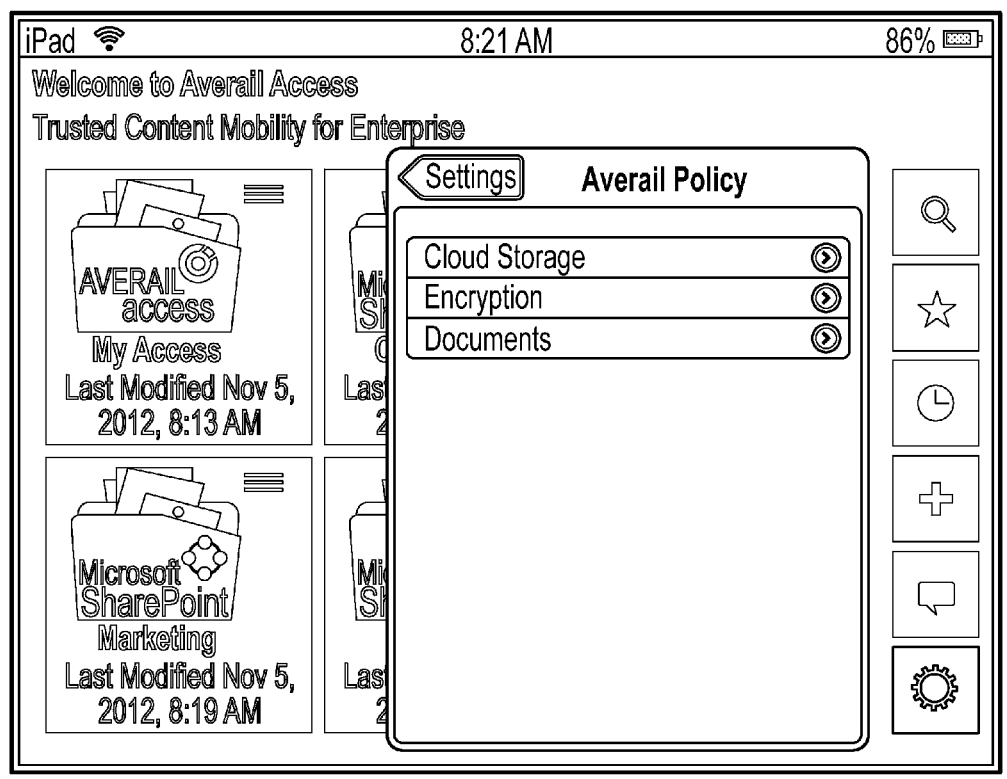
FIG. 43 is an Averail Policy view, under an embodiment.
Figure 44:
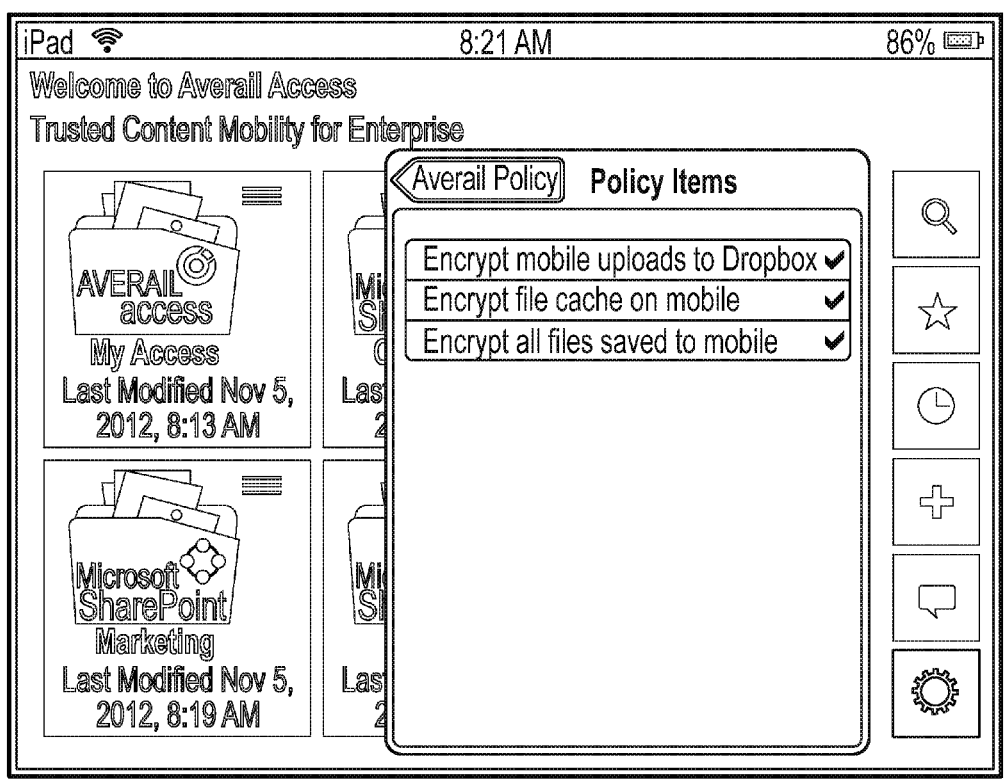
FIG. 44 is a policy items page, under an embodiment.

FIG. 38 shows a Policy section of the settings panel. The Policy section includes a show policies option. Selecting the show policies option navigates a user to an Averail Policy view as seen in FIG. 43. The Averail Policy view displays a list of current policies configured for the user, content and device. Under an embodiment, the Averail Policy view organizes these policies under Cloud Storage, Encryption and Document categories but embodiments are not so limited. Selecting the Encryption category navigates a user to a Policy Items page (FIG. 44) which lists encryption policies including encrypt mobile uploads to Dropbox, encrypt file cache on mobile device, and encrypt all files saved to mobile device but embodiments are not so limited.

Figure 45:
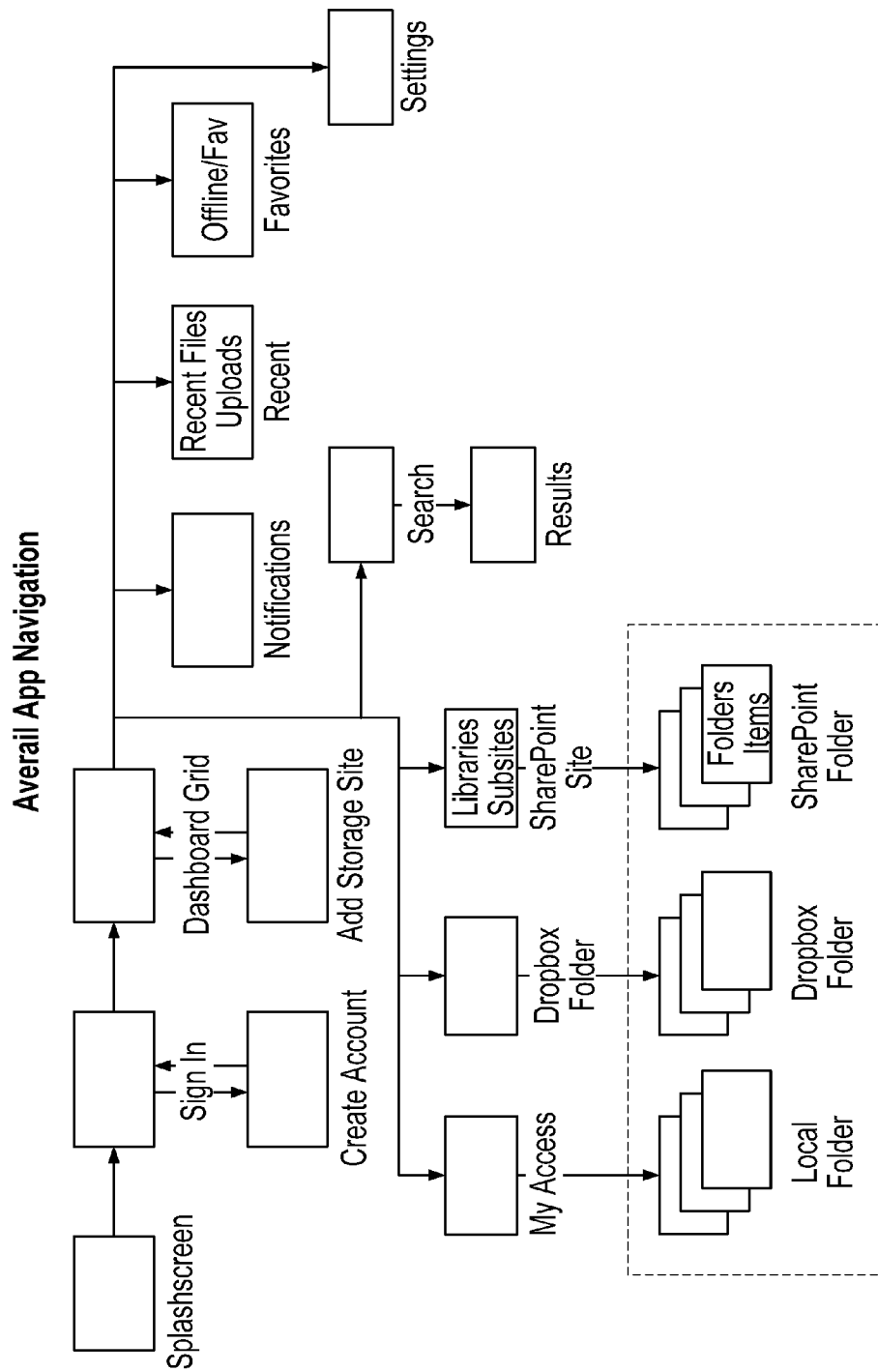
FIG. 45 is an Averail mobile application interface navigation diagram, under an embodiment.

FIG. 45 is an Averail mobile application interface navigation diagram, under an embodiment. The diagram provides general overview of workflow among interface pages under one embodiment.

Embodiments described herein include a virtual file management system (VFMS) that provides a user access to managed content on one or more mobile devices. The VFMS comprises a plurality of storage domains that store the managed content distributively using one or more file systems. The VFMS comprises at least one server hosting a data infrastructure that organizes the managed content into a virtual file system. The data infrastructure comprises a component that generates and maintains policies defining controls for permissible operations on the managed content with respect to the user on the one or more mobile devices. The VFMS comprises a client application hosted on the one or more mobile devices. The client application comprises a user interface. The client application is coupled to the data infrastructure and the plurality of storage domains and includes an enforcement component that retrieves and enforces the policies by applying the controls on the one or more mobile devices. The client application retrieves information of the virtual file system and provides access to the managed content by processing data requests using permissible operations. The client application exposes the permissible operations and the information of the virtual file system to one or more mobile applications that run on the one or more mobile devices and provides the access to the managed content through the user interface.

Embodiments described herein include a virtual file management system (VFMS) providing a user access to managed content on one or more mobile devices, the system comprising: a plurality of storage domains that store the managed content distributively using one or more file systems; at least one server hosting a data infrastructure that organizes the managed content into a virtual file system, wherein the data infrastructure comprises a component that generates and maintains policies defining controls for permissible operations on the managed content with respect to the user on the one or more mobile devices; and a client application hosted on the one or more mobile devices, wherein the client application comprises a user interface, wherein the client application is coupled to the data infrastructure and the plurality of storage domains and includes an enforcement component that retrieves and enforces the policies by applying the controls on the one or more mobile devices, wherein the client application retrieves information of the virtual file system and provides access to the managed content by processing data requests using permissible operations, wherein the client application exposes the permissible operations and the information of the virtual file system to one or more mobile applications that run on the one or more mobile devices and provides the access to the managed content through the user interface.

The components described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, HTTPs, FTP, SMTP, WAP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the systems and methods in light of the above detailed description.

What is claimed is:

1. A virtual file management system (VFMS) providing a user access to managed content on one or more mobile devices, the system comprising:

a plurality of storage domains that store the managed content distributively on one or more non-transitory computer-readable storage mediums using one or more file systems;

at least one server hosting a data infrastructure that organizes the managed content into a virtual file system, wherein the data infrastructure comprises a component that generates and maintains policies defining controls for permissible operations on the managed content with respect to the user on the one or more mobile devices; and a client application hosted on the one or more mobile devices, wherein the client application is stored on one or more non-transitory computer-readable storage mediums associated with the one or more mobile devices and is executable by one or more processors, wherein the client application comprises a user interface, wherein the client application is coupled to the data infrastructure and the plurality of storage domains and includes an enforcement component that retrieves and enforces the policies by applying the controls on the one or more mobile devices, wherein the client application retrieves information of the virtual file system and provides access to the managed content by processing data requests using permissible operations, wherein the client application exposes the permissible operations and the information of the virtual file system to one or more mobile applications that run on the one or more mobile devices and provides the access to the managed content through the user interfaces, and wherein the client application accesses the managed content stored on one or more of the plurality of storage domains such that a corresponding access operation is transmitted from the one or more mobile devices directly to the one or more of the plurality of storage domains.

2. The system of claim 1, wherein the user interface displays a plurality of icons respectively associated with one of the one or more file system.

3. The system of claim 1, wherein the client application includes a search feature for performing a global search across a plurality of the one or more file systems.

4. The system of claim 1, wherein the client application manages one or more policies received from the at least one server.

5. The system of claim 4, wherein the client application manages the one or more policies received from the at least one server such that, in response to an input from a user, the client application displays a list of current policies configured for the user.

6. The system of claim 1, wherein the corresponding access operation transmitted from the one or more mobile devices directly to the one or more of the plurality of storage domains is transmitted such that the corresponding access operation is not intercepted by the at least one server.

* * * * *